(12) United States Patent
Nishiwaki et al.

(10) Patent No.: US 12,410,343 B2
(45) Date of Patent: Sep. 9, 2025

(54) PRESSURE-SENSITIVE ADHESIVE SHEET

(71) Applicant: NITTO DENKO CORPORATION, Ibaraki (JP)

(72) Inventors: Masataka Nishiwaki, Ibaraki (JP); Kazuki Minoura, Ibaraki (JP); Yasushi Buzojima, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 532 days.

(21) Appl. No.: 17/797,932

(22) PCT Filed: Feb. 1, 2021

(86) PCT No.: PCT/JP2021/003562
§ 371 (c)(1),
(2) Date: Aug. 5, 2022

(87) PCT Pub. No.: WO2021/157533
PCT Pub. Date: Aug. 12, 2021

(65) Prior Publication Data
US 2023/0070327 A1   Mar. 9, 2023

(30) Foreign Application Priority Data
Feb. 7, 2020 (JP) ................................ 2020-020147

(51) Int. Cl.
*C09J 7/38* (2018.01)
*B32B 37/12* (2006.01)
(Continued)

(52) U.S. Cl.
CPC .............. *C09J 7/385* (2018.01); *B32B 37/12* (2013.01); *C08K 5/0041* (2013.01); *C08K 5/01* (2013.01);
(Continued)

(58) Field of Classification Search
None
See application file for complete search history.

(56) References Cited

U.S. PATENT DOCUMENTS

2004/0238393 A1* 12/2004 Ohi ...................... A61F 15/001
604/385.02
2016/0084991 A1   3/2016 Umemoto et al.
(Continued)

FOREIGN PATENT DOCUMENTS

| CN | 106916541 A | 7/2017 |
|---|---|---|
| JP | 2005-263994 A | 9/2005 |

(Continued)

OTHER PUBLICATIONS

Machine translation of JP 2009132803 A (Year: 2009).*
(Continued)

*Primary Examiner* — Frank D Ducheneaux
(74) *Attorney, Agent, or Firm* — Sughrue Mion, PLLC

(57) ABSTRACT

Provided is a PSA sheet having limited light transmission, an increased refractive index and good adhesive properties. The PSA sheet provided by this invention has a PSA layer. The PSA sheet has a total light transmittance below 80%. The PSA layer has a first face and a second face on the opposite side to the first face. The PSA layer comprises high-refractive-index particles. In the PSA layer, the high-refractive-index particles are concentrated in a range that extends from the first face towards the second face side and has a thickness of at least 100 nm, accounting for less than 50% of the PSA layer thickness.

8 Claims, 2 Drawing Sheets

(51) Int. Cl.
    *C08K 3/22*         (2006.01)
    *C08K 5/00*         (2006.01)
    *C08K 5/01*         (2006.01)
    *C09J 11/04*       (2006.01)
    *C09J 133/08*      (2006.01)

(52) U.S. Cl.
    CPC ............ *C09J 11/04* (2013.01); *C09J 133/08* (2013.01); *B32B 2264/1024* (2020.08); *B32B 2264/301* (2020.08); *B32B 2264/503* (2020.08); *B32B 2307/4026* (2013.01); *C08K 2003/2244* (2013.01); *C08K 2201/003* (2013.01); *C09J 2203/326* (2013.01); *C09J 2301/302* (2020.08); *C09J 2301/312* (2020.08); *C09J 2301/408* (2020.08); *C09J 2433/00* (2013.01)

(56) References Cited

U.S. PATENT DOCUMENTS

2016/0133876 A1    5/2016   Abe et al.
2018/0134922 A1    5/2018   Katami et al.

FOREIGN PATENT DOCUMENTS

| | | |
|---|---|---|
| JP | 2009-132803 A | 6/2009 |
| JP | 2011-84733 A | 4/2011 |
| JP | 2016-180099 A | 10/2016 |
| JP | 2017-26826 A | 2/2017 |
| JP | 2017-57375 A | 3/2017 |
| JP | 2019-196468 A | 11/2019 |
| WO | 2014/208429 A1 | 12/2014 |
| WO | 2015/108159 A1 | 7/2015 |

OTHER PUBLICATIONS

Notice of Reasons for Refusal issued Feb. 8, 2024 in Japanese Application No. 2020-020147.
First Office Action dated Oct. 19, 2023, issued in Chinese Application No. 202180011830.2.
International Search Report for PCT/JP2021/003562 dated, Apr. 6, 2021 (PCT/ISA/210).

* cited by examiner

PRESSURE-SENSITIVE ADHESIVE SHEET

CROSS REFERENCE TO RELATED APPLICATIONS

This application is a National Stage of International Application No. PCT/JP2021/003562 filed Feb. 1, 2021, claiming priority based on Japanese Patent Application No. 2020-020147 filed Feb. 7, 2020; the entire content of which is incorporated herein by reference.

TECHNICAL FIELD

The present invention relates to a pressure-sensitive adhesive sheet.

BACKGROUND ART

In general, pressure-sensitive adhesive (PSA) exists as a soft solid (a viscoelastic material) in a room temperature range and has a property to adhere easily to an adherend with some pressure applied. With such properties, PSA is widely used for purposes such as bonding, fixing and protecting components inside portable electronic devices such as cell phones. For instance, PSA sheets having light-blocking PSA layers are used for purposes such as preventing reflection and preventing light leakage from self-luminous elements such as light sources and organic EL (electroluminescence) of backlight modules and the like of liquid crystal displays in portable electronic devices such as mobile phones. Literatures related to this type of art include Patent Document 1. Patent Documents 2 and 3 teach PSA sheets applied to polarizing film in liquid crystal display devices, etc.

CITATION LIST

Patent Literature

[Patent Document 1] Japanese Patent Application Publication No. 2017-57375
[Patent Document 2] WO 2015/108159
[Patent Document 3] Japanese Patent Application Publication No. 2019-196468

SUMMARY OF INVENTION

Technical Problem

While some PSA sheets are for optical applications requiring transparency such as those placed on the visible side of an image display (screen), others are used in applications where constant light-blocking is necessary (Patent Document 1). For instance, for placement on the backside of an image display in a portable electronic device, a light-blocking PSA is used to reduce reflection of the light through the screen and prevent reduction of screen visibility. For purposes such as design and adjustment (e.g., unevenness reduction) made to the adherend appearance through the PSA sheet, there are some applications where PSA sheets with limited light transmission are desired. As described above, PSA sheets varying in light transmission (having a certain level of light-blocking, light-dimming properties, etc.) are used in accordance with purposes, application areas, etc.

Various devices such as the aforementioned sort of portable electronic devices use optical sensors using light such as infrared (IR) light, visible light and ultraviolet (UV) light for purposes including device operation, nearby object detection, detection of the surrounding brightness (ambient light) and data communication. The light used in an optical sensor passes through the material constituting the device to actuate the intended function; however, when the light is blocked by the sort of reflection inside the device, it may affect sensor accuracy or cause poor sensor response. As for the PSA sheet used in the device, when the difference in refractive index (RI) is large between itself and the member to which the PSA sheet is applied, the light may be reflected at their interface, badly affecting the accuracy of the optical sensor. For instance, among materials to which a PSA with limited light transmission is applied (such as back materials placed on backsides of image displays), many have higher refractive indices than the PSA. The difference in refractive index between the PSA sheet and the adherend may cause light reflection at the interface between the two. Especially, in a light-blocking PSA sheet having 10% or lower total light transmittance, when the light that should be absorbed in the PSA sheet is reflected at the interface between the PSA sheet and the adherend, it may cause malfunction or poor response.

With respect to PSA sheets with limited light transmission, studies have been conducted on enhancing and adjusting the light absorption and reflection, but not on reducing the light reflection caused by the difference in refractive index from the adherend. If a PSA sheet capable of reducing light reflection while limiting light transmission is provided, it has great practical advantages in application areas where non-transparency is desired, such as an ability to prevent the aforementioned decrease in optical sensor accuracy. Focusing on this point, the so far latent problem has been recognized and worked to complete the present invention. In other words, an objective of this invention is to provide a novel PSA sheet having limited light transmission with an increased refractive index and good adhesive properties.

Solution to Problem

This Description provides a PSA sheet having a PSA layer. The PSA sheet has a total light transmittance below 80%. The PSA layer has a first face and a second face on the opposite side to the first face. The PSA layer comprises high-refractive-index particles (high-RI particles). In the PSA layer, the high-RI particles are concentrated (localized) in a range that extends from the first face towards the second face side and has a thickness of at least 100 nm, accounting for less than 50% of the PSA layer thickness.

According to the thus-constituted PSA sheet, in an embodiment with limited light transmission, because the PSA layer comprises high-RI particles concentrated in the first face side, the refractive index of the first face can be effectively increased while reducing deterioration of adhesive properties such as adhesive strength. With the PSA layer's first face having an increased refractive index, for instance, when applied to an adherend having a higher refractive index than known general PSAs, light reflection can be reduced at the interface with the adherend.

In some embodiments, the PSA sheet has a total light transmittance of 10% or lower. Such a PSA sheet can be preferably used in applications requiring light-blocking properties such as anti-light-leakage and anti-reflection.

In some preferable embodiments, the first face's refractive index (or first-face refractive index (RI)) is higher by at least 0.05 than the second face's refractive index (or second-face refractive index (RI)). The high-RI particle content concentrated in the first face side of the PSA layer can bring about a PSA sheet having an increased first-face refractive index relative to the second face.

In some preferable embodiments, the first face's 180° peel strength on stainless steel plate is at least 70% of the second face's 180° peel strength on stainless steel plate. The high-RI particle content concentrated in the first face side of the PSA layer can bring about a PSA sheet having an increased refractive index with a reduced decrease in the adhesive strength of the first face.

In some preferable embodiments, the PSA sheet has a thickness in the range between 10 µm and 50 µm. With the PSA sheet thickness being 10 µm or greater, limited light transmission can be preferably obtained with desirable adhesive properties. With the PSA sheet thickness being 50 µm or less, it may well accommodate needs for thinning (thickness reduction) and weight saving. The thickness can be preferably applied to a substrate-free double-faced PSA sheet consisting of the PSA layer. Having no substrate, the substrate-free double-faced PSA sheet can be made thinner by that much, possibly contributing to downsizing and space saving in products to which the double-faced PSA sheet is applied. In a substrate-free PSA sheet, the effect of the PSA layer such as adhesive strength and impact resistance can be maximized.

In some preferable embodiments, the high-RI particles have a mean particle diameter in the range between 1 nm and 100 nm. With the use of high-RI particles having particle diameters in this range, the first-face refractive index can be effectively increased while reducing deterioration of adhesive properties such as adhesive strength.

The PSA layer disclosed herein can be an acrylic PSA layer comprising an acrylic polymer as base polymer. In an embodiment having an acrylic PSA layer, the art disclosed herein can preferably combine an increase in refractive index with reduced deterioration of adhesive properties.

The PSA layer may further comprise a black colorant. With the black colorant content of the PSA layer, the total light transmittance of the PSA sheet can be decreased while obtaining desirable light-blocking properties. As the black colorant, for instance, carbon black particles can be preferably used.

In some preferable embodiments, the black colorant is included at least in a thickness range from the second face to 50% of the PSA layer thickness (i.e., a thickness range that includes 50% of the PSA layer thickness from the second face). This embodiment preferably brings about the blackening effect of the black colorant, possibly enhancing the designability of the PSA sheet.

The PSA sheet disclosed herein can be preferably used, for instance, in order to bond (typically fix) a member of a portable electronic device. The portable electronic device may include an optical sensor. The use of the PSA sheet disclosed herein can reduce light reflection, thereby lessening the influence on operation of the optical sensor. As described above, among portable electronic devices, those having light sources need to be prevented from light leakage. As for those having display screens, the sort of screen visibility needs to be ensured by preventing internal light reflection as well as reflection of external incident light such as sunlight, etc. Accordingly, it is particularly significant to apply the art disclosed herein to reduce light reflection and enhance light-blocking properties while preventing light leakage and ensuring screen visibility.

DESCRIPTION OF EMBODIMENTS

Figure 1:
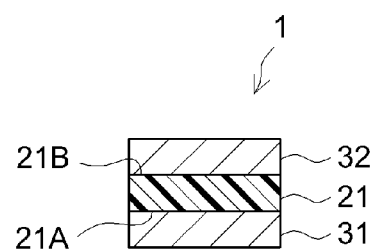
FIG. 1 shows a cross-sectional diagram schematically illustrating a structural example of the PSA sheet.

Preferable embodiments of the present invention are described below. Matters necessary to practice this invention other than those specifically referred to in this description may be comprehended by a person of ordinary skill in the art based on the instruction regarding implementations of the invention according to this description and the common technical knowledge in the pertinent field. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent the accurate sizes or reduction scales of a product actually provided by the present invention.

As used herein, the term "PSA" refers to, as described earlier, a material that exists as a soft solid (a viscoelastic material) in a room temperature range and has a property to adhere easily to an adherend with some pressure applied. As defined in "Adhesion: Fundamental and Practice" by C. A. Dahlquist (McLaren & Sons (1966), P. 143), PSA referred to herein may generally be a material that has a property satisfying complex tensile modulus $E^*(1\ Hz) < 10^7\ dyne/cm^2$ (typically, a material that exhibits the described characteristics at 25° C.).

<Region Concentrated with High-RI Particles>

This Description provides a PSA sheet that has a PSA layer comprising high-RI particles and has a total light transmittance limited to below 80%. The PSA layer has first and second faces. The first face is one surface of the PSA layer, typically the surface (adhesive face) that can be adhered to an adherend. The second face is the other surface of the PSA layer, that is, the surface on the opposite side to the first face. The second face can be an adhesive face or a surface not intended for adhesion to an adherend. For instance, in a substrate-supported single-faced PSA sheet or substrate-supported double-faced PSA sheet as described later, the second face of the PSA layer may assume a bonding surface (interface) to the substrate surface (non-release face).

The high-RI particles are particles capable of increasing the PSA layer's refractive index. Hereinafter, high-RI particles may also be written "particles $P_{HRI}$" (or simply "$P_{HRI}$"). HRI stands for high refractive index. The particle $P_{HRI}$ content is concentrated in the first face side of the PSA layer. This makes the first face side a $P_{HRI}$-concentrated region (or "Region A" hereinafter; i.e., a region concentrated with high-RI particles). According to such an embodiment, with a contribution of the particles $P_{HRI}$ in Region A, the PSA layer's first-face RI can be increased. For instance, a PSA sheet having a first-face RI of 1.50 or higher can be prepared. As the particles $P_{HRI}$, solely one species or a combination of two or more species can be used.

The ratio of the thickness of the region concentrated with particles $P_{HRI}$ (i.e., the Region A thickness) is preferably less than 50% of the PSA layer thickness. When the thickness ratio of Region A is thus limited, the increase in the PSA layer's first-face RI can be favorably combined with other properties (e.g., adhesive strength, impact resistance, etc.). From such a standpoint, the thickness ratio of Region A in the PSA layer can be, for instance, 40% or lower, 30% or lower, 20% or lower, 15% or lower, 10% or lower, or even 5% or lower. From the standpoint of better minimizing the decrease in adhesive strength while increasing the refractive index, in some embodiments, the thickness ratio of Region A can be 2.5% or lower, 1.5% or lower, 1.0% or lower, 0.80% or lower, 0.60% or lower, or even 0.50% or lower. The minimum thickness ratio of Region A is not particularly limited and can be selected to obtain a desirable RI-increasing effect. From the standpoint of the ease of managing the Region A thickness (and even the quality stability), the thickness ratio of Region A can be, for instance, 0.01% or higher, 0.05% or higher, 0.10% or higher, 0.30% or higher, 0.80% or higher, 1.2% or higher, or even 1.7% or higher.

In some embodiments, $P_{HRI}$-concentrated Region A in the PSA layer is preferably a range that extends from the PSA layer's first face towards the second face side (i.e., towards inside the PSA layer) and has a thickness of 100 nm or greater. When Region A having such a thickness extends from the PSA layer's first face towards the second face side, the fast-face RI-increasing effect is preferably obtained. From the standpoint of the ease of obtaining a greater effect, the Region A thickness can be 130 nm or greater, 180 nm or greater, 230 nm or greater, 300 nm or greater, 600 nm or greater, 900 nm or greater, 1.0 µm or greater, 2.0 µm or greater, 3.0 µm or greater, or even 4.0 µm or greater. The maximum Region A thickness is not particularly limited and can be, for instance, 10 µm or less, 7.0 µm or less, 5.0 µm or less, 2.5 µm or less, or even 1.5 µm or less. From the standpoint of better minimizing the decrease in adhesive strength due to the inclusion of Region A, in some embodiments, the Region A thickness can be less than 1.0 µm, less than 700 nm, less than 400 nm, less than 250 nm, less than 200 nm, or even less than 180 nm.

The Region A thickness is measured by the method described later in Examples. The thickness ratio of Region A is determined based on the Region A thickness $T_A$ and the Region-A-containing PSA layer thickness $T_0$. The thickness of Region A can be adjusted through the composition (e.g., polymer species, solvent species) of the PSA layer or the PSA composition used for forming the PSA layer, the Region A formation method, materials (e.g., dispersion medium of the high-RI particle dispersion, particle concentration) used in the method, etc.

<Constitutional Examples of PSA Sheet>

The PSA sheet disclosed herein can be a substrate-supported PSA sheet having a PSA layer on one or each face of a non-releasable substrate (support substrate), or a substrate-free PSA sheet (i.e., a PSA sheet free of a non-releasable substrate) in the form of a PSA layer held on a release liner. The concept of PSA sheet herein may encompass so-called PSA tape, PSA labels, PSA film, etc. The PSA sheet disclosed herein can be in a roll or in a flat sheet. Alternatively, the PSA sheet may be processed into various shapes. The PSA layer disclosed herein is typically formed in a continuous form, but is not limited to such a form. For instance, the PSA layer may be formed in a regular or random pattern of dots, stripes, etc.

Figure 2:
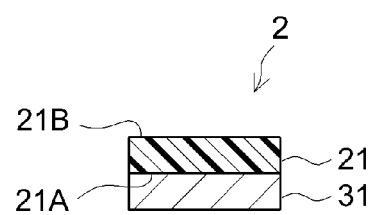
FIG. 2 shows a cross-sectional diagram schematically illustrating another structural example of the PSA sheet.

FIGS. 1 and 2 illustrate structural examples of the substrate-free double-faced PSA sheet (substrate-free PSA sheet of the adhesively double-faced type). In a PSA sheet 1 shown in FIG. 1, the first and second faces 21A and 21B of a substrate-free PSA layer 21 are protected with release liners 31 and 32, respectively, each liner having a release face on at least the PSA layer side. When using PSA sheet 1, the first and second faces (adhesive faces) 21A and 21B of PSA layer 21 can be individually adhered to adherends. In a PSA sheet 2 shown in FIG. 2, the first face 21A of a substrate-free PSA layer 21 is protected with release liner 31 having a release face on each side. This can be wound so that the other surface (adhesive face) 21B of PSA layer 21 is brought into contact with the backside of release liner 31, with the second face 21B also protected with release liner 31. Alternatively, the second face 2B of substrate-free PSA layer 21 can be protected with release liner 31 whose both sides are release faces. From the viewpoint of reducing the PSA sheet thickness, the art disclosed herein can be preferably implemented in such a substrate-free form. The substrate-free PSA sheet can be easily made thinner and is also advantageous for possible maximization of PSA properties such as adhesive strength and impact resistance.

Figure 3:
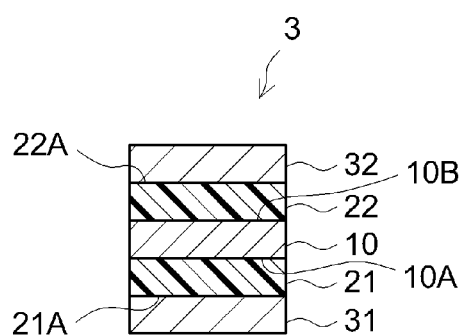
FIG. 3 shows a cross-sectional diagram schematically illustrating another structural example of the PSA sheet.

For instance, the PSA sheet disclosed herein may also have a cross-sectional structure as schematically illustrated in FIG. 3. PSA sheet 3 shown in FIG. 3 has a support substrate 10 as well as first and second PSA layers 21 and 22 supported on two faces 10A and 10B of support substrate 10, respectively. The second faces of the first and second PSA layers 21 and 22 are bonded to the two faces 10A and 10B (both non-releasable surfaces (non-release faces)) of support substrate 10, respectively. Both first and second faces 10A and 10B have non-releasable surfaces (non-release faces). For use of PSA sheet 3, the first and second faces (adhesive faces) 21A and 22A of first and second PSA layers 21 and 22 are applied to adherends, respectively. In other words, PSA sheet 3 is formed as a double-faced PSA sheet (an adhesively double-faced PSA sheet). PSA sheet 3 prior to use is in an embodiment where first and second adhesive faces 21A and 22A are protected with release liners 31 and 32 having releasable surfaces (release faces) at least on their PSA-facing sides. In an alternative embodiment, release liner 32 is omitted; and using a release liner 31 having a release face on each side, PSA sheet 3 can be wound to protect the second adhesive face 22A with the backside of release liner 31 brought in contact therewith.

The art disclosed herein is preferably implemented as the aforementioned substrate-free or substrate-supported double-faced PSA sheet to fasten or join components. While not shown in the drawings, alternatively, the PSA sheet disclosed herein may be a substrate-supported single-faced PSA sheet having a PSA layer only on one face of a non-releasable substrate (support substrate). An example of the single-faced PSA sheet has a configuration shown in FIG. 1, but either without the first PSA layer 21 or without the second PSA layer 22.

The PSA sheet disclosed herein has a PSA layer having a $P_{HRI}$-concentrated region (Region A). As for the PSA layer, the PSA sheet may have solely a Region-A-containing PSA layer or may have a Region-A-free PSA layer in addition to a Region-A-containing PSA layer. For instance, like in PSA sheet 3 shown in FIG. 3, in a substrate-supported double-faced PSA sheet having two PSA layers isolated by a support substrate, solely one PSA layer may have Region A, or each of the two PSA layers may have Region A. When only one PSA layer formed on either face of the support substrate has Region A, the PSA layer formed on the other face of the support substrate may comprise particles $P_{HRI}$ (e.g., throughout the entire PSA layer) or may be free of particles $P_{HRI}$. According to an embodiment where the PSA layer formed on the other face of the support substrate is free of particles $P_{HRI}$, better adhesive properties may be obtained on the other face.

Figure 4:
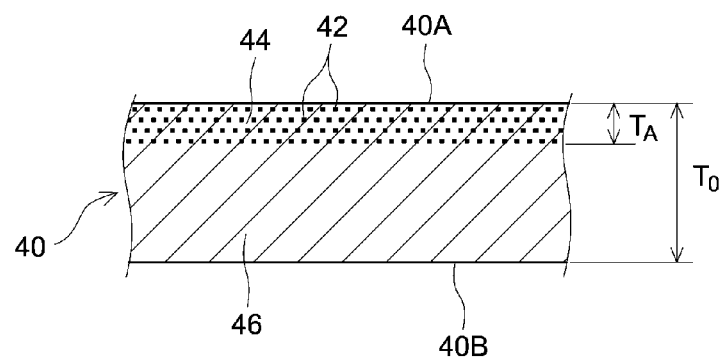
FIG. 4 shows a cross-sectional diagram schematically illustrating the PSA layer in the PSA sheet according to an embodiment.

FIG. 4 shows a cross-sectional diagram schematically illustrating an embodiment of a PSA layer 40 having a $P_{HRI}$-concentrated region (Region A). PSA layer 40 has a first face 40A and a second face 40B on the opposite side thereto. PSA layer 40 comprises high-RI particles (particles $P_{HRI}$) 42. High-RI particles 42 are concentrated in the first face 40A side of PSA layer 40, forming a $P_{HRI}$-concentrated region (Region A) 44. $P_{HRI}$-concentrated region 44 has a thickness $T_A$ preferably corresponding to a range that extends from the first face 40A towards the second face 40B side of PSA layer 40 and has a thickness of 100 nm or greater, accounting for less than 50% of the thickness $T_0$ of PSA layer 40. In PSA layer 40, the second face 40B side of $P_{HRI}$-concentrated region 44 is a base region 46 essentially free of high-RI particles 42.

PSA layer 40 in such an embodiment can be used as the PSA layer of a substrate-free PSA sheet as those shown in FIGS. 1 and 2, as at least one PSA layer in a substrate-supported PSA sheet as shown in FIG. 3, or as the PSA layer of a single-faced PSA sheet not shown in the drawings. $P_{HRI}$-concentrated region 44 can be formed, for instance, by a wet-on-dry method (WOD method) that comprises applying a $P_{HRI}$-containing dispersion (or "particle $P_{HRI}$ dispersion" hereinafter) to the first face of a PSA layer (a starting PSA layer) formed of a base PSA, and allowing particles $P_{HRI}$ to permeate into the PSA layer. $P_{HRI}$-concentrated region 44 can also be formed by a wet-on-wet method (WOW method) in which a $P_{HRI}$-free base PSA composition is applied, a $P_{HRI}$-containing dispersion is then provided thereatop, and the resulting coating is allowed to cure.

<Properties of PSA Sheet>
(Total Light Transmittance)

The PSA sheet disclosed herein has a total light transmittance below 80%. With the total light transmittance limited up to the prescribed value, it is possible to adjust the adherend appearance through the PSA sheet (e.g., reduce unevenness in the adherend appearance) and provide design features. From the standpoint of enhancing the light-blocking properties, the total light transmittance can be 75% or lower, 70% or lower, 65% or lower, or even 60% or lower (e.g., 55% or lower). The minimum total light transmittance is not particularly limited. It can be 0%, that is, at or below detection limit. From industrial viewpoints including retention of adhesive properties, ease of manufacturing and efficiency, the total light transmittance can be above 0.01% (e.g., above 0.05%), even above 0.1%, 1% or higher, for instance, 3% or higher, or even about 5% or higher.

In some preferable embodiments, the PSA sheet has a total light transmittance of 10% or lower. Such a PSA sheet may have light-blocking properties suited for preventing light leakage and reflection. In this embodiment, the total light transmittance of the PSA sheet can be below 10%. In some preferable embodiments, the PSA sheet has a total light transmittance below 8.0%, possibly below 6.0%, below 3.0%, more preferably below 1.00%, yet more preferably below 0.50%, or particularly preferably below 0.30% (e.g., below 0.10%). The PSA sheet showing such a total light transmittance can bring about excellent light-blocking properties. The minimum total light transmittance is not particularly limited and can be essentially 0%, that is, at or below detection limit.

The total light transmittance of the PSA sheet can be determined by the method described later in Examples. The total light transmittance of the PSA sheet can be adjusted through the PSA components (components of the PSA; preferably the species and amount used of particles, favorably pigments, etc.), placement of a colored layer, etc.

(Refractive Index)

In the PSA sheet disclosed herein, the first face of the Region-A-containing PSA layer has an increased refractive index. The refractive index may vary depending on the purpose and application, and thus is not limited to a specific range. In some preferable embodiments, the first face has a refractive index of, for instance, 1.50 or higher. With the PSA layer's first face having such a refractive index, when the first face is applied to a material having a higher refractive index than the PSA forming the PSA layer's second face, light reflection can be reduced at the interface between the two. For instance, regarding a light-blocking PSA sheet, it is not desirable that the light that should be absorbed in the PSA sheet is reflected at the interface with the adherend. In such an embodiment, it is particularly significant to reduce light reflection while having an increased refractive index. From such a standpoint, the refractive index is preferably 1.52 or higher, possibly 1.54 or higher, 1.56 or higher, or even 1.58 or higher. According to the PSA sheet having a PSA layer whose first face has such a refractive index, in an embodiment where the first face is applied to a material having a high refractive index, light reflection can be favorably reduced at the interface with the adherend. In some embodiments, the refractive index is 1.60 or higher, or can be even 1.61 or higher. According to the PSA sheet that has a PSA layer whose first face has such a refractive index, in an embodiment where the first face is applied to a material having a higher refractive index, light reflection can be favorably reduced at the interface with the adherend. The maximum refractive index may vary depending on the adherend's refractive index, etc. Thus, it is not limited to a specific range. For instance, it is 1.70 or lower, can be 1.66 or lower, 1.65 or lower, or even 1.63 or lower. The refractive index of the first face can be adjusted based on the Region A thickness and composition (e.g., the monomer composition of the polymer in base PSA, the species of particles $P_{HRI}$, etc.).

In case of a double-faced PSA sheet having first and second PSA layers on one and the other faces of a support substrate, the refractive indices of the first faces of the first and second PSA layers may be the same or different. In an embodiment of the double-faced PSA sheet with the respective PSA layers differing in refractive index, the first face of one PSA layer (e.g., the first PSA layer) preferably has an aforementioned refractive index and the other PSA layer (e.g., the second PSA layer) may have a refractive index of, for instance, lower than 1.50.

With the first face side having Region A, the PSA layer disclosed herein may have an increased first-face RI as compared with its second-face RI. In the PSA layer disclosed herein, the second face side (e.g., the 1 μm thickness range from the second face) is typically a region essentially free of particles $P_{HRI}$. Thus, the degree of increase in first-face RI relative to the second-face RI may serve as an indication of the RI-increasing effect of using particles $P_{HRI}$. From the standpoint of obtaining a good RI-increasing effect on the first face, the difference (Δn) obtained by subtracting the second-face RI from the first-face RI is, for instance, possibly 0.03 or greater, preferably 0.05 or greater, or more preferably 0.07 or greater. For a greater effect, in some embodiments, Δn can be 0.09 or greater, 0.11 or greater, 0.12 or greater, or even 0.13 or greater. The upper limit of Δn is not particularly limited. From the standpoint of reducing deterioration of adhesive properties such as adhesive strength, Δn can be, for instance, 0.25 or less, 0.20 or less, or even 0.18 or less.

The second-face RI is not particularly limited and can be, for instance, 1.40 or higher. From the standpoint of the ease of obtaining a high RI on the first face, the second-face RI is preferably 1.43 or higher, more preferably 1.45 or higher, or yet more preferably 1.46 or higher. The maximum second-face RI is not particularly limited. From the standpoint of the ease of obtaining good adhesive properties (e.g., adhesive strength) on the second face, in some embodiments, the second-face RI can be, for instance, below 1.50, or even below 1.48. The second-face RI can be adjusted through the PSA layer composition (e.g., the monomer composition of the polymer in the base PSA, etc.) in the second face side (e.g., in the 1 μm thickness range from the second face).

Here, the refractive index of the PSA layer surface (the first or second face) can be determined at 23° C., using a commercial refractometer (a multi-wavelength Abbe refractometer or spectroscopic ellipsometer). As the multi-wavelength Abbe refractometer, for instance, model DR-M2 available from ATAGO Co., Ltd. or a comparable product is used. As the spectroscopic ellipsometer, for instance, product name EC-400 (available from J.A. Woollam Company) or a comparable product is used. In particular, the refractive index can be determined by the method described later in Examples. In Examples described later, the refractive index at 500 nm wavelength is determined; however, this does not limit the refractive index range to which the technical ideas perceived from this Description are applied. In the art disclosed herein, the concept of refractive index includes a refractive index of light in a specific wavelength range selected in the visible light range (380 nm to 780 nm), and may further include a refractive index of light in a specific wavelength range selected in the UV range (380 nm or shorter, e.g., 100 nm to 380 nm) and IR range (780 nm or longer, e.g., 780 nm to 2500 nm).

(Adhesive Strength)

In the PSA sheet disclosed herein, the 180° peel strength (adhesive strength) of the PSA layer's first face may vary depending on the purpose and application area and thus is not limited to a specific range. The first face may have an adhesive strength of, for instance, 0.3 N/10 mm or greater. From the standpoint of obtaining good adhesion to adherends, the adhesive strength is suitably about 1.0 N/10 mm or greater, preferably about 2.0 N/10 mm or greater, or more preferably about 3.0 N/10 mm or greater. In the art disclosed herein, with the presence of particles $P_{HRI}$ concentrated in the first face side of the PSA layer, while effectively increasing the refractive index with a contribution of the particles $P_{HRI}$, such an adhesive strength can be preferably obtained. In some embodiments, when the PSA layer comprises a colorant (e.g., black colorant such as carbon black particles) for purposes such as adjusting the light transmission, such an adhesive strength can be achieved. From the standpoint of the stability of bonding to adherends, the adhesive strength can be about 4.0 N/10 nm or greater. The maximum adhesive strength is not particularly limited and is, for instance, 12 N/10 mm or less, or possibly 8 N/10 mm or less (e.g., 5 N/10 mm or less). The 180° peel strength can be determined by the method described later in Examples.

When the PSA sheet disclosed herein is in the form of a substrate-free double-faced PSA sheet, for the PSA layer constituting the substrate-free double-faced PSA sheet, the first-face 180° peel strength (adhesive strength) may vary depending on the purpose and application area and thus is not limited to a specific range. In the PSA layer disclosed herein, the second face side (e.g., the 1 μm thickness range from the second face) is typically an essentially $P_{HRI}$-free region. Thus, the degree of decrease in first-face adhesive strength relative to the second-face adhesive strength (i.e., the adhesive strength retention rate of the first face relative to the second face) may be indicative of how well (to what extent) the decrease in adhesive strength due to the use of particles $P_{HRI}$ is reduced.

The adhesive strength retention rate is determined by the following equation:

Adhesive strength retention rate (%)=(1−B/A)×100

Here, in the equation, A is the first-face adhesive strength (N/10 mm) of the PSA layer and B is the second-face adhesive strength (N/10 nm) of the PSA layer.

With the presence of particles $P_{HRI}$ concentrated in the first face side of the PSA layer, the art disclosed herein can provide a PSA sheet whose first face has an increased RI (e.g., with the RI difference being 0.03 or greater, preferably 0.05 or greater) as well as an adhesive strength retention rate of 70% or higher relative to the second face. From the standpoint of the bond reliability, etc., the adhesive strength retention rate is preferably 75% or higher, more preferably 80% or higher (e.g., 85% or higher), or yet more preferably 90% or higher. The maximum adhesive strength retention rate is not particularly limited. It is typically 100% or lower. From a practical viewpoint such as combining with adhesive properties, it can also be 99% or lower, or 97% or lower.

The second-face adhesive strength of the PSA layer may vary depending on the purpose and application area, and thus is not limited to a specific range. The second face may have an adhesive strength of, for instance, 0.5 N/10 mm or greater. From the standpoint of obtaining good bonding properties relative to adherends, the adhesive strength is suitably about 1.5 N/10 mm or greater, preferably about 2.5 N/10 mm or greater, or more preferably about 3.5 N/10 mm or greater. In the art disclosed herein, with the presence of particles $P_{HRI}$ concentrated in the first face side of the PSA layer, while effectively increasing the first-face RI, such a second-face adhesive strength can be preferably obtained. In some embodiments, such an adhesive strength can be obtained when the PSA layer comprises a colorant (e.g., black colorant such as carbon black) for purposes such as adjusting the light transmission. From the standpoint of the bond stability to adherends, the adhesive strength can be about 4.0 N/10 mm or greater, or even about 4.5 N/10 mm or greater. The maximum adhesive strength is not particularly limited and can be, for instance, 12 N/10 mm or less, or 8 N/10 mm or less (e.g., 5 N/10 mm or less). The second-face adhesive strength can be determined in the same manner as the first-face adhesive strength.

In a substrate-supported PSA sheet (encompassing a substrate-supported double-faced PSA sheet and a substrate-supported single-faced PSA sheet) whose second face is bonded to the surface (non-release face) of a support substrate, that the second face of the PSA layer has a high adhesive strength can be advantageous for enhancing the tightness of bonding (anchoring) of the PSA layer to the support substrate. Thus, when the PSA sheet disclosed herein is in the form of a substrate-supported PSA sheet, it can also be advantageous to have a reduced decrease in second-face adhesive strength because of the presence of particles $P_{HRI}$ concentrated in the first face side of the PSA layer.

<PSA Layer>

(Base Polymer)

In the art disclosed herein, the type of the PSA constituting the PSA layer is not particularly limited. The PSA layer may comprise, as adhesive polymer (or "base polymer" hereinafter, meaning a structural polymer that forms the PSA), one, two or more species among various rubber-like polymers such as acrylic polymer, rubber-based polymer (natural rubber, synthetic rubber, a mixture of these, etc.), polyester-based polymer, urethane-based polymer, polyether-based polymer, silicone-based polymer, polyamide-based polymer, and fluoropolymer that can be used in the PSA field. From the standpoint of the adhesive properties, cost, etc., a preferable PSA comprises an acrylic polymer or a rubber-based polymer as the base polymer. In particular, an acrylic PSA (a PSA whose base polymer is an acrylic polymer) is preferable. In the following, a PSA sheet having an acrylic PSA layer (i.e., a PSA layer formed of an acrylic PSA) is mainly described; however, the PSA layer in the PSA sheet disclosed herein is not to be limited to those formed of acrylic PSA. By applying the art disclosed herein, an acrylic PSA having a refractive index of 1.50 or higher can be favorably obtained. By applying the art disclosed herein, it is possible to favorably obtain an acrylic PSA layer having a first-face RI of, for instance, 1.50 or higher.

In the following, a PSA sheet having an acrylic PSA layer (i.e., a PSA layer formed of an acrylic PSA) is mainly described; however, the PSA layer in the PSA sheet disclosed herein is not to be limited to those formed of acrylic PSA.

The "base polymer" of a PSA refers to a rubber-like polymer in the PSA. Besides this, it is not limited to a particular interpretation. The rubber-like polymer refers to a polymer that shows rubber elasticity around room temperature. As used herein, the "main component" (primary component) refers to a component accounting for more than 50% by weight.

The "acrylic polymer" refers to a polymer that includes a monomeric unit derived from a monomer having at least one (meth)acryloyl group per molecule. Hereinafter, a monomer having at least one (meth)acryloyl group per molecule is referred to as an "acrylic monomer." Thus, as used herein, the acrylic polymer is defined to be a polymer that includes a monomeric unit derived from an acrylic monomer. Typical examples of the acrylic polymer include an acrylic polymer in which the acrylic monomer accounts for more than 50% by weight of all monomers used in synthesizing the acrylic polymer.

As used herein, the term "(meth)acryloyl" is meant to be inclusive of acryloyl and methacryloyl. Likewise, "(meth)acrylate" means acrylate and methacrylate, and "(meth)acryl" is meant to be inclusive of acryl and methacryl respectively.

(Acrylic Polymer)

A preferable example of the acrylic polymer in the art disclosed herein is a polymer formed from a starting monomer mixture that comprises an alkyl (meth)acrylate as the primary monomer. Here, the primary monomer refers to a component that accounts for more than 50% by weight of the monomer composition of the starting monomer mixture.

For example, a compound represented by the following formula (1) can be advantageously used as the alkyl (meth)acrylate.

$$CH_2=C(R^1)COOR^2 \qquad (1)$$

Here, $R^1$ in the formula (1) is a hydrogen atom or a methyl group. $R^2$ is an acyclic alkyl group having 1 to 20 carbon atoms (hereinafter such a range of the number of carbon atoms may be expressed as "$C_{1-20}$"). From the standpoint of the storage elastic modulus of the PSA and the like, the primary monomer is suitably an alkyl (meth)acrylate in which $R^2$ is a acyclic $C_{1-14}$ (e.g., $C_{2-10}$, typically $C_{4-8}$) alkyl group. From the standpoint of the adhesive properties, the primary monomer is preferably an alkyl acrylate in which $R^1$ is a hydrogen atom and $R^2$ is an acyclic $C_{4-8}$ alkyl group (which may also be simply referred to as a $C_{4-8}$ alkyl acrylate).

Specific examples of the alkyl (meth)acrylate having a $C_{1-20}$ acyclic alkyl group for $R^2$ include, but are not limited to, methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate. These alkyl (meth)acrylates can be used singly as one species or in a combination of two or more species. Favorable examples of the alkyl (meth)acrylate include n-butyl acrylate (BA) and 2-ethylhexyl acrylate (2EHA).

Typically, the amount of the alkyl (meth)acrylate among the monomeric components constituting the acrylic polymer is more than 50% by weight, for example 70% by weight or more, may be 85% by weight or more, or may be even 90% by weight or more. The maximum percent alkyl (meth)acrylate is not particularly limited. It is preferably 99.5% by weight or less (e.g., 99% by weight or less); or from the standpoint of preferably obtaining properties (e.g., cohesive strength) based on a secondary monomer such as a carboxy group-containing monomer, it may be 98% by weight or less (e.g., less than 97% by weight). Alternatively, the acrylic polymer may be a polymer essentially formed of an alkyl (meth)acrylate.

When using a $C_{4-8}$ alkyl acrylate as a monomer, of the alkyl (meth)acrylate content of the monomers, the $C_{4-8}$ alkyl acrylate accounts for preferably 70% by weight or more, or more preferably 90% by weight or more. The art disclosed herein can be preferably implemented in an embodiment in which BA accounts for at least 50% (typically at least 60%) by weight of all monomers. In some preferable embodiments, of all monomers, BA may account for 70% by weight or more, 80% by weight or more, or even 90% by weight or more. The monomers may further comprise 2EHA in a lower proportion than BA.

The art disclosed herein can be preferably implemented in an embodiment in which the starting monomer mixture includes at least 50% $C_{1-4}$ alkyl (meth)acrylate by weight. The ratio of $C_{1-4}$ alkyl (meth)acrylate in the monomers may be 70% by weight or higher, or may be 85% by weight or higher (e.g., 90% by weight or higher). On the other hand, from the standpoint of obtaining good cohesive strength, the ratio of $C_{1-4}$ alkyl (meth)acrylate in the starting monomers is suitably 99.5% by weight or lower, and this amount may be 98% by weight or lower (for example, 97% by weight or lower).

The art disclosed herein can be preferably implemented in an embodiment in which the $C_{2-4}$ alkyl acrylate accounts for 50% by weight or more (e.g., 70% by weight or more, 85% by weight or more, or 90% by weight or more) of the monomers. Specific examples of the $C_{2-4}$ alkyl acrylate include ethyl acrylate, propyl acrylate, isopropyl acrylate, n-butyl acrylate (BA), isobutyl acrylate, s-butyl acrylate, and t-butyl acrylate. The $C_{2-4}$ alkyl acrylates can be used singly as one species or in a combination of two or more species. According to such an embodiment, the resulting PSA sheet is likely to show tight adhesion to an adherend. In preferable embodiments, BA accounts for more than 50% by weight (e.g., 70% by weight or more, or 85% by weight or more, or 90% by weight or more) of the monomers. When the $C_{2-4}$ alkyl acrylate (e.g., BA) is used at least in a prescribed amount, for instance, even if a black colorant (e.g., carbon black) is added to the PSA, the colorant can be well dispersed in the layer while maintaining good levels of adhesive properties such as adhesive strength. From the standpoint of obtaining satisfactory cohesive strength, the ratio of $C_{2-4}$ alkyl (meth)acrylate in the monomers is suitably 99.5% by weight or lower, or possibly 98% by weight or lower (e.g., below 97% by weight).

The art disclosed herein can be implemented in an embodiment where the starting monomer mixture includes at least 50% (e.g., at least 70%, at least 85% or at least 90%) $C_{5-20}$ alkyl (meth)acrylate by weight. A preferable $C_{5-20}$ alkyl (meth)acrylate is a $C_{6-14}$ alkyl (meth)acrylate. In some embodiments, a $C_{6-10}$ alkyl acrylate (e.g., a $C_{8-10}$ alkyl acrylate) can be preferably used.

A secondary monomer may be copolymerized in the acrylic polymer in the art disclosed herein. Secondary monomers can introduce functional groups capable of constituting cross-linking points in the acrylic polymer or can contribute to increasing adhesive strength. Examples of such secondary monomers include carboxy group-containing monomers, hydroxyl group (OH group)-containing monomers, acid anhydride group-containing monomers, amide group-containing monomers, amino group-containing monomers, epoxy group-containing monomers, cyano group-containing monomers, keto group-containing monomers, monomers having a nitrogen atom-containing ring, alkoxysilyl group-containing monomers and imide group-containing monomers. For the secondary monomer, solely one species or a combination of two or more species can be used.

A preferable example of the acrylic polymer in the art disclosed herein is an acrylic polymer in which a carboxy group-containing monomer is copolymerized as the secondary monomer. Examples of the carboxy group-containing monomer include acrylic acid (AA), methacrylic acid (MAA), carboxyethyl (meth)acrylate, carboxypentyl (meth) acrylate, itaconic acid, maleic acid, fumaric acid, crotonic acid, and isocrotonic acid. In particular, AA and MAA are preferable.

Other favorable examples include an acrylic polymer in which a hydroxy group-containing monomer is copolymerized as the secondary monomer. Examples of hydroxy group-containing monomers include hydroxyalkyl (meth) acrylates such as 2-hydroxyethyl (meth)acrylate, 2-hydroxypropyl (meth)acrylate, 3-hydroxypropyl (meth)acrylate, 2-hydroxybutyl (meth)acrylate, and 4-hydroxybutyl (meth) acrylate; polypropylene glycol mono (meth)acrylate; and N-hydroxyethyl (meth)acrylamide. A particularly preferable hydroxy group-containing monomer is a hydroxyalkyl (meth)acrylate having a linear alkyl group with 2 to 4 carbon atoms.

Examples of amide group-containing monomers include (meth)acrylamide, N,N-dimethyl (meth)acrylamide, N-butyl (meth)acrylamide, N-methylol (meth)acrylamide, N-methylolpropane (meth)acrylamide, N-methoxymethyl (meth)acrylamide, and N-butoxymethyl (meth)acrylamide.

Examples of amino group-containing monomers include aminoethyl (meth)acrylate, N,N-dimethylaminoethyl (meth) acrylate, and t-butylaminoethyl (meth)acrylate.

Examples of epoxy group-containing monomers include glycidyl (meth)acrylate, methylglycidyl (meth)acrylate, and allyl glycidyl ether.

Examples of cyano group-containing monomers include acrylonitrile and methacrylonitrile.

Examples of keto group-containing monomers include diacetone (meth)acrylamide, diacetone (meth)acrylate, vinyl methyl ketone, vinyl ethyl ketone, allyl acetoacetate, and vinyl acetoacetate.

Examples of monomers having a nitrogen atom-containing ring include N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, and N-(meth)acryloylmorpholine.

Examples of alkoxysilyl group-containing monomers include 3-(meth)acryloxypropyltrimethoxysilane, 3-(meth) acryloxypropyltriethoxysilane, 3-(meth)acryloxypropylmethyldimethoxysilane, and 3-(meth)acryloxypropylmethyldiethoxysilane.

When the monomers forming the acrylic polymer include an aforementioned functional group-containing monomer, the amount of the functional group-containing monomer among the monomeric components is not particularly limited. From the standpoint of suitably exhibiting the effect of using the functional group-containing monomer, the amount of the functional group-containing monomer among the monomeric components can be, for example, 0.1% by weight or more, a suitable amount is 0.5% by weight or more, and this amount may be 1% by weight or more. From the standpoint of facilitating the balance of adhesive performance in relation to the primary monomer, a suitable amount of the functional group-containing monomer among the monomeric components is 40% by weight or less, and this amount is preferably 20% by weight or less, or may be 10% by weight or less (e.g., 5% by weight or less).

In the base polymer according to some preferable embodiments, the monomers forming the base polymer (e.g., acrylic polymer) may include a carboxy group-containing monomer. The monomers including the carboxy group-containing monomer are likely to result in a PSA sheet showing good adhesive properties (cohesive strength, etc.). This can be advantageous in improving the tightness of adhesion between the PSA layer and the adherend. Furthermore, for instance, when a black colorant such as carbon black is added to the PSA, copolymerization of a carboxy group-containing monomer in a suitable amount facilitates dispersion of the colorant in the layer and the adhesive properties can be preferably retained.

In an embodiment in which a carboxy group-containing monomer is copolymerized in the base polymer, the amount of carboxy group-containing monomer in the monomers forming the base polymer is not particularly limited and it can be, for example, 0.2% by weight or more (typically 0.5% by weight or more) of the monomers. It is suitably 1% by weight or more or can be 2% by weight or more, or even 3% by weight or more. With more than 3% carboxy group-containing monomer by weight, a greater effect can be obtained. In some embodiments, the amount of carboxy group-containing monomer in the monomers can be 3.2% by weight or more, 3.5% by weight or more, 4% by weight or more, or even 4.5% by weight or more. The maximum amount of carboxy group-containing monomer is not particularly limited. For instance, it can be 15% by weight or less, 12% by weight or less, or even 10% by weight or less. The art disclosed herein can be preferably implemented in an embodiment in which the carboxy group-containing monomer content is 7% by weight or less (typically less than 7% by weight, e.g., 6.8% by weight or less, or 6.0% by weight or less).

The monomers forming the acrylic polymer may include other comonomer besides the secondary monomer for the purpose of improving the cohesiveness or the like. Examples of the other comonomer include vinyl ester monomers such as vinyl acetate, vinyl propionate, and vinyl laurate; aromatic vinyl compounds such as styrene, substituted styrene (α-methylstyrene and the like), and vinyl toluene; cycloalkyl (meth)acrylates such as cyclohexyl (meth)acrylate, cyclopentyl (meth)acrylate, and isobornyl (meth)acrylate; aromatic ring-containing (meth)acrylates such as aryl (meth)acrylates (e.g., phenyl (meth)acrylate), aryloxyalkyl (meth)acrylates (e.g., phenoxyethyl (meth)acrylate), and arylalkyl (meth)acrylates (e.g., benzyl (meth)acrylate); olefinic monomers such as ethylene, propylene, isoprene, butadiene, and isobutylene; chlorine-containing monomers such as vinyl chloride and vinylidene chloride; isocyanate group-containing monomers such as 2-(meth)acryloyloxyethyl isocyanate; alkoxy group-containing monomers such as methoxyethyl (meth)acrylate and ethoxyethyl (meth)acrylate; vinyl ether monomers such as methyl vinyl ether and ethyl vinyl ether; and polyfunctional monomers having two or more (e.g., three or more) polymerizable functional groups (e.g., (meth)acryloyl groups) in a molecule, such as 1,6-hexanediol di(meth)acrylate and trimethylolpropane tri(meth)acrylate.

The amount of such other comonomer is not particularly limited and may be suitably selected according to the purpose and application. From the standpoint of suitably obtaining the effect of the use thereof, a suitable amount is 0.05% by weight or more, and this amount may be 0.5% by weight or more. From the standpoint of facilitating the balance of the PSA performance, a suitable amount of the other copolymerizable component among the monomeric components is 20% by weight or less, and this amount may be 10% by weight or less (e.g., 5% by weight or less). The art disclosed herein also can be preferably implemented in an embodiment in which the monomeric components include substantially no other copolymerizable components. Here, the expression that the monomeric components include substantially no other copolymerizable monomers means that no other copolymerizable monomers is used at least intentionally. For example, it may be permitted that about 0.01% by weight or less of other copolymerizable monomers is included unintentionally.

The copolymer composition of the acrylic polymer can be suitably designed so that the polymer has a glass transition temperature (Tg) of about −15° C. or below (e.g., about −70° C. or above and −15° C. or below). Here, the acrylic polymer's Tg refers to the Tg value determined by the Fox equation based on the composition of the monomers used in the synthesis of the polymer. As shown below, the Fox equation is a relational expression of the Tg of a copolymer and the glass transition temperatures Tgi of the homopolymers obtained by homopolymerization of the monomers constituting the copolymer.

$$1/Tg = \Sigma(Wi/Tgi)$$

In the Fox equation above, Tg represents the glass transition temperature (unit: K) of the copolymer, Wi the weight fraction (copolymerization ratio by weight) of a monomer i in the copolymer, and Tgi the glass transition temperature (unit: K) of the homopolymer of the monomer i.

As for the glass transition temperatures of homopolymers used in Tg determination, values disclosed in publicly known resources are used. For instance, with respect to the monomers listed below, as the glass transition temperatures of their corresponding homopolymers, the following values are used.

| | |
|---|---|
| 2-ethylhexyl acrylate | −70° C. |
| isononyl acrylate | −60° C. |
| n-butyl acrylate | −55° C. |
| ethyl acrylate | −22° C. |
| methyl acrylate | 8° C. |
| methyl methacrylate | 105° C. |
| 2-hydroxyethyl acrylate | −15° C. |
| 4-hydroxybutyl acrylate | −40° C. |
| vinyl acetate | 32° C. |
| acrylic acid | 106° C. |
| methacrylic acid | 228° C. |

With respect to the Tg values of the homopolymers of other monomers besides those exemplified above, the values given in "Polymer Handbook" (3rd edition, John Wiley & Sons, Inc., Year 1989) are used. When the Polymer Handbook provides two or more values for a certain monomer, the highest value is used. In the case where the values are not described in the Polymer Handbook, those that can be obtained by the measuring method described in Japanese Patent Application Publication No. 2007-51271 is used.

While no particular limitations are imposed, from the standpoint of the impact resistance and tightness of adhesion to an adherend, the Tg of the acrylic polymer is advantageously about −25° C. or lower, preferably about −35° C. or lower, and more preferably about −40° C. or lower, but these values are not particularly limiting. In some embodiments, from the standpoint of cohesiveness, the Tg of the acrylic polymer may be, for example, about −65° C. or higher, about −60° C. or higher, or about −55° C. or higher. The art disclosed herein can be preferably implemented in an embodiment in which the Tg of the acrylic polymer is about −65° C. or higher and about −35° C. or lower (e.g., about −55° C. or higher and about −40° C. or lower). The Tg of the acrylic polymer can be adjusted by suitably changing the monomer composition (that is, the type of monomers used for synthesizing the polymer and the ratio of the amounts used).

The method for obtaining the acrylic polymer is not particularly limited. Various polymerization methods known as synthetic means for acrylic polymers can be suitably employed, with the methods including solution polymerization method, emulsion polymerization, bulk polymerization, suspension polymerization, and photopolymerization. For example, a solution polymerization method can be preferably used. The polymerization temperature in the solution polymerization can be suitably selected according to the types of monomers and solvent to be used, the type of polymerization initiator, and the like. It can be, for example, about 20° C. to 170° C. (typically, about 40° C. to 140° C.).

As for the solvent (polymerization solvent) used in solution polymerization, a suitable species can be selected among heretofore known organic solvents. For instance, one species of solvent or a mixture of two or more species of solvent can be used, selected among aromatic compounds (typically aromatic hydrocarbons) such as toluene; acetic acid esters such as ethyl acetate; aliphatic or alicyclic hydrocarbons such as hexane and cyclohexane; halogenated alkanes such as 1,2-dichloroethane; lower alcohols (e.g., monohydric alcohols with one to four carbon atoms) such as isopropanol; ethers such as tert-butyl methyl ether; and ketones such as methyl ethyl ketone.

The initiator used for polymerization can be suitably selected among heretofore known polymerization initiators according to the type of polymerization method. For example, one or two or more species of azo polymerization initiators such as 2,2'-azobisisobutyronitrile (AIBN) can be preferably used. Other examples of the polymerization initiator include persulfates such as potassium persulfate; peroxide initiators such as benzoyl peroxide and hydrogen peroxide; substituted ethane initiators such as phenyl-substituted ethane; and aromatic carbonyl compounds. Still other examples of the polymerization initiator include redox type initiators based on a combination of a peroxide and a reducing agent. Such polymerization initiators can be used singly as one species or in a combination of two or more species. The polymerization initiator can be used in a typical amount, for example, about 0.005 part to 1 part by weight (typically, about 0.01 part to 1 part by weight) to 100 parts by weight of the monomers.

The solution polymerization yields a polymerization reaction mixture as a solution of acrylic polymer in an organic solvent. The PSA layer in the art disclosed herein may be formed from a PSA composition comprising the polymerization reaction mixture or an acrylic polymer solution obtained by subjecting the reaction mixture to a suitable work-up. For the acrylic polymer solution, the polymerization reaction mixture can be used after adjusted to suitable viscosity and/or concentration as necessary. Alternatively, an acrylic polymer can be synthesized by a polymerization method other than solution polymerization, such as emulsion polymerization, photopolymerization, bulk polymerization, etc., and an acrylic polymer solution prepared by dissolving the acrylic polymer in an organic solvent can be used as well.

The weight average molecular weight (Mw) of the base polymer (preferably acrylic polymer) in the art disclosed herein is not particularly limited, and may be, for example, in the range of about $10 \times 10^4$ to $500 \times 10'$. From the standpoint of the adhesive properties, the Mw of the base polymer is in the range of about $30 \times 10^4$ to $200 \times 10^4$ (more preferably, about $45 \times 10^4$ to $150 \times 10^4$, typically about $65 \times 10^4$ to $130 \times 10^4$). Here, Mw refers to a value obtained based on polystyrene standards by gel permeation chromatography (GPC). As the GPC apparatus, for example, model name "HLC-8320 GPC" (column: TSK gel GMH-H (S), available from Tosoh Corporation) can be used.

(Particles $P_{HRI}$)

As the particle $P_{HRI}$ included in the PSA layer, it is possible to use various materials capable of increasing the first-face refractive index of the PSA layer to 1.50 or higher. Known general PSAs have refractive indices lower than 1.50 (e.g., about 1.47). With respect to a PSA having such a compositional basis, for instance, when particles formed of a material having a refractive index higher than 1.50 are included locally in the first face side of the PSA layer formed using the PSA, the first-face refractive index can be increased. As the particles $P_{HRI}$, it is possible to use one, two or more species of particles formed from a material having a refractive index of, for instance, 1.60 or higher, preferably 1.70 or higher, more preferably 1.80 or higher, or yet more preferably 2.00 or higher (e.g., 2.20 or higher). The maximum refractive index of the material forming the particles $P_{HRI}$ (or "$P_{HRI}$-forming material" hereinafter) is not particularly limited. From the standpoint of the ease of handling in view of the compatibility with the PSA, it is, for instance, 3.00 or lower, possibly 2.80 or lower, 2.50 or lower, or even 2.20 or lower. The refractive index of the $P_{HRI}$-forming material is determined for a single layer of the material (with a refractometrically-analyzable layer thickness) at 23° C. using a commercial spectroscopic ellipsometer. The applicable wavelength range is the same as the refractive index of the PSA layer surface. As the spectroscopic ellipsometer, for instance, product name EC-400 (J.A. Woollam Company) or a comparable product is used.

The species of particles $P_{HRI}$ is not particularly limited. One, two or more species of materials capable of increasing the PSA layer's first-face refractive index can be used among metal particles, metal compound particles, organic particles, and organic/inorganic composite particles. As the particles $P_{HRI}$, it is preferable to use a species capable of increasing the PSA layer's first-face refractive index among inorganic oxides (e.g., metal oxides). Favorable examples of the $P_{HRI}$-forming material include inorganic oxides (specifically, metal oxides) such as titania (titanium oxide, $TiO_2$), zirconia (zinc oxide, $ZrO_2$), cerium oxide, aluminum oxide, zinc oxide, tin oxide, copper oxide, barium titanate and niobium oxide ($Nb_2O_5$, etc.). Among particles formed of these inorganic oxides (e.g., metal oxides), solely one species or a combination of two or more species can be used. In particular, particles formed of titania or zirconia are preferable, and particles formed of zirconia are particularly preferable. As the metal particles, for instance, iron-based, zinc-based, tungsten-based and platinum-based materials may have high refractive indices. As for the organic particles, particles formed of resins such as a styrene-based resin, phenol resin, polyester-based resin and polycarbonate-based resin have relatively high refractive indices. Examples of the organic/inorganic composite particles include particles of a composite of aforementioned inorganic and organic materials, and inorganic particles coated with an organic material such as a resin. The particles $P_{HRI}$ does not comprise carbon black particles and can be defined as particles different from carbon black particles. Typically, the particles $P_{HRI}$ are free of a light-absorbing black colorant.

In view of the compatibility with adhesive components, as the particles $P_{HRI}$, it is preferable to use particles obtained by subjecting aforementioned organic and/or inorganic particles to a surface treatment with a surface treatment agent. Such a surface treatment can effectively improve the compatibility of nano-sized particles having a mean particle size of less than 1 μm. As the surface treatment, a suitable treatment can be selected in accordance with the species of core particles, the kind of dispersion medium, etc.; and therefore, it is not limited to a specific treatment. The surface treatment typically allows the surface treatment agent to modify core particles (e.g., inorganic particles such as a metal oxide). The surface treatment agent can be a compound that has a functional group (carboxyl group, sulfonate group, phosphate group, hydroxy group, amino group, isocyanate group, vinyl group, alkoxysilyl group, etc.) reactive towards core particles (e.g., inorganic particles such as a metal oxide) and further has an aliphatic group, alicyclic group, aromatic group or other organic group such as an alkyl group, alkenyl group, (meth) acryloyl group and phenyl group. Because the organic group has a certain level of hydrophobicity (lipophilicity), the surface of core particles (e.g., inorganic particles such as a metal oxide) can be hydrophobized by the surface treatment to be highly compatible (mix well) with adhesive components including a polymer such as an acrylic or rubber-based polymer. Such a surface treatment can be referred to as a hydrophobic surface treatment (hydrophobization). By a preferable surface treatment, reactive groups such as alkenyl groups and (meth) acryloyl groups may constitute the surface of particles $P_{HRI}$. Examples of the surface treatment agent include organic acids such as aliphatic carboxylic acids; surfactants (including reactive surfactants having reactive functional groups) such as anionic surfactants (sulfonate-based, phosphate-based, fatty acid-based, etc.); functional group-containing (meth) acrylates; silane compounds such as silane coupling agents and alkoxysilanes; siloxane compounds; silazane compounds; and titanium coupling agents. These surface treatment agents may be used singly as one species or in a combination of two or more species. The surface treatment agent is used in surface treatment of core particles, employing a suitable method and conditions (amount of surface treatment agent used, use/nonuse of reaction aid, solvent, temperature, time, etc.) known to a skilled person.

In some preferable embodiments, for the core particles (e.g., inorganic particles of a metal oxide, etc.) of particles $P_{HRI}$, a surface treatment (hydrophobization) using a sulfonate-based compound can be employed. Possible sulfonate-based compounds for use include sulfonate-based surfactants such as alkylbenzene sulfonates such as nonylbenzene sulfonate and dodecylbenzene sulfonate; naphthalene sulfonates such as dodecylnaphthalene sulfonate; and alkyldiphenyl ether disulfonates such as dodecyldiphenyl ether disulfonate. As the sulfonate-based compound, solely one species or a combination of two or more species can be used.

In other embodiments, for the core particles (e.g., inorganic particles of a metal oxide, etc.) of particles $P_{HRI}$, the applicable surface treatment (hydrophobization) may use a carboxyl group-containing compound (a saturated or unsaturated aliphatic carboxylic acid, methacrylic acid, etc.) as the surface treatment agent. In some other embodiments, the applicable surface treatment (hydrophobization) may use an isocyanate group-containing (meth)acrylate such as methacryloyloxyethyl isocyanate (MOI) or a polyfunctional (meth)acrylate such as dipentaerythritol hexaacrylate (DPHA) as the surface treatment agent. In yet other embodiments, the applicable surface treatment (hydrophobization) may use a vinyl group-containing alkoxysilane such as vinyltrimethoxysilane (VTMS) or a silane compound such as (meth)acryloyl group-containing alkoxysilane as the surface treatment agent.

The mean particle diameter of particles $P_{HRI}$ is not particularly limited. Particles having a suitable size capable of desirably increasing the refractive index can be used in accordance with the PSA layer thickness, PSA species, etc. The particles $P_{HRI}$ have a mean particle diameter of, for instance, possibly about 1 nm or greater, or suitably about 5 nm or greater. From the standpoint of the refractive index enhancement, compatibility, handling properties, etc., the particles $P_{HRI}$ have a mean particle diameter of preferably about 10 nm or greater, possibly about 20 nm or greater, or even about 30 nm or greater. From the standpoint of retaining adhesive properties, etc., the maximum mean particle diameter is suitably, for instance, about 300 nm or less. For increasing the refractive index, it is preferably about 100 nm or less, more preferably about 70 nm or less, yet more preferably about 50 nm or less, or possibly even about 35 nm or less (e.g., about 25 nm or less).

The mean particle diameter of particles $P_{HRI}$ refers to the median volume diameter, in particular, the particle diameter at the 50th percentile (the 50th-percentile particle diameter, which may be abbreviated as $D_{50}$ hereinafter) in a size distribution obtained with respect to a dispersion of particles $P_{HRI}$ using a particle size meter based on laser scattering/diffraction. As the analyzer, for instance, product name MICROTRAC MT3000II available from MicrotracBEL Corporation or a comparable product can be used.

The particle $P_{HRI}$ content in the PSA layer (i.e., the ratio of the weight of particles $P_{HRI}$ to the total weight of the PSA layer) is not particularly limited. The particle $P_{HRI}$ content may vary depending on the target refractive index, etc. For instance, the particle $P_{HRI}$ content can be suitably selected so that the PSA layer will have a prescribed or higher first-face refractive index in view of the required adhesive properties, etc. In the PSA layer disclosed herein, with the particle $P_{HRI}$ content concentrated in the first face side, a desirable RI-increasing effect can be obtained on the first face, for instance, even when a smaller amount of particles $P_{HRI}$ is included in the PSA layer as compared with when particles $P_{HRI}$ are included more or less evenly throughout the entire PSA layer. This can be advantageous in view of the adhesive properties as well as coloring properties in an embodiment where the PSA layer comprises a colorant (e.g., black colorant such as carbon black). The particle $P_{HRI}$ content in the PSA layer can be, for instance, below 30% by weight, below 20% by weight, or even below 10% by weight. In some preferable embodiments, the particle $P_{HRI}$ content in the PSA layer can be, for instance, below 5% by weight, below 1% by weight, or even below 0.5% by weight. The minimum particle $P_{HRI}$ content in the PSA layer can be selected to obtain a desirable RI. For instance, it can be 0.01% by weight or higher, 0.05% by weight or higher, or even 0.1% by weight or higher.

Particles $P_{HRI}$ can be used for forming a PSA layer having a $P_{HRI}$-concentrated region (Region A), for instance, in the form of a dispersion including the particles $P_{HRI}$ in a dispersion medium. As the dispersion medium, a suitable dispersion medium can be used in accordance with the Region A formation method, preferably in view of the composition of the PSA layer or the PSA composition used for forming the PSA layer. An organic solvent is preferably used from the standpoint of the ease of forming Region A and the ease of controlling thickness $T_A$ thereof. Examples of the organic solvent include alcohols such as methanol, ethanol, isopropanol and ethylene glycol; ketones such as acetone, methyl ethyl ketone (MEK), methyl isobutyl ketone, methyl propyl ketone (MPK), cyclohexanone and cyclopentanone; ethers such as diethyl ether, tetrahydrofuran, dioxane, anisole, propylene glycol monomethyl ether (PGME) and propylene glycol monomethyl ether acetate; esters such as ethyl acetate, butyl acetate, methyl acetate and methyl lactate; aromatic hydrocarbons such as benzene, toluene and xylene; aliphatic hydrocarbons such as n-hexane and cyclohexane; amides such as dimethylformamide and dimethylacetamide (DMA); and cellosolves such as methyl cellosolve, ethyl cellosolve and butyl cellosolve. These organic solvents may be used singly as one species or as a mixture of two or more species. Among them, alcohols, ketones, esters (e.g., acetic acid esters) and amides are preferable. For instance, it is preferable to use ethanol, isopropanol, methyl ethyl ketone, methyl propyl ketone, methyl isobutyl ketone and dimethylacetamide.

The concentration of particles $P_{HRI}$ in the $P_{HRI}$-containing dispersion is not particularly limited and can be, for instance, about 0.1% to 50% by weight. From the standpoint of the permeation into the PSA layer and the compatibility with the base PSA composition, in some embodiments, the particle $P_{HRI}$ concentration is suitably about 20% by weight or lower, preferably about 15% by weight or lower (e.g., 0.5% to 15% by weight), more preferably about 10% by weight or lower (e.g., 1.0% to 10% by weight), or possibly even 7% by weight or lower (e.g., 1.5% to 7% by weight). In some embodiments, from the standpoint of facilitating formation of Region A that is highly effective in increasing the first-face RI, the particle $P_{HRI}$ concentration is preferably 1.6% by weight or higher, or more preferably 1.8% by weight or higher, for instance, possibly 2.0% by weight or higher.

The weight fraction WI (% by weight) of particles $P_{HRI}$ in the dry weight of the particle $P_{HRI}$ dispersion (i.e., the weight of non-volatiles in the dispersion) is not particularly limited and can be, for instance, in the range between 5% and 100% by weight. From the standpoint of the ease of forming Region A by using the particle $P_{HRI}$ dispersion and the ease of controlling the Region A thickness $T_A$, in some embodiments, the weight fraction W1 is preferably 25% by weight or higher, more preferably 50% by weight or higher, yet more preferably 75% by weight or higher, possibly 85% by weight or higher, 90% by weight or higher, 95% by weight or higher, 98% by weight or higher, or even 99% by weight or higher. It can also be essentially 100% by weight. Here, that the weight fraction W1 of the particle $P_{HRI}$ dispersion is essentially 100% by weight means at least absence of deliberate inclusion of non-volatiles other than particles $P_{HRI}$. In such a particle $P_{HRI}$ dispersion, the weight fraction W1 can be, for instance, 99.5% by weight or higher (preferably 99.9% by weight or higher).

In some embodiments, the particle $P_{HRI}$ dispersion is preferably limited in polymer content. The polymer content in the particle $P_{HRI}$ dispersion is, for instance, preferably below 10% by weight of the dry weight of the dispersion (i.e., the weight of non-volatiles in the dispersion), more preferably below 5% by weight, possibly below 3% by weight, below 1% by weight, or even below 0.5% by weight. In some embodiments, it is preferable to use a particle $P_{HRI}$ dispersion essentially free of a polymer. Here, that the particle $P_{HRI}$ dispersion is essentially free of polymers means at least absence of deliberate inclusion of a polymer in the particle $P_{HRI}$ dispersion. In such a particle $P_{HRI}$ dispersion, the weight fraction of polymers in the dry weight of the dispersion can be, for instance, 0% or higher and below 0.01% by weight. Especially, in a dispersion of particles $P_{HRI}$ having a relatively small mean particle diameter (e.g., a mean particle diameter of 100 nm or less), because the particles $P_{HRI}$ are likely to aggregate due to interactions with polymers, it is significant to limit the polymer content. By limiting the polymer content of the particle $P_{HRI}$ dispersion, the mobility of particles $P_{HRI}$ in the dispersion can be increased; and in the Region A formation by the wet-on-wet method or wet-on-dry method described later, particles $P_{HRI}$ can be well-incorporated in a suitable manner into the base PSA composition or the base PSA layer.

Here, in the particle $P_{HRI}$ dispersion, the polymer subject to quantitative limitations is typically an organic macromolecular compound having a weight average molecular weight of about $1 \times 10^4$ or higher. The weight average molecular weight refers to the value obtained by GPC based on standard polystyrenes, like the base polymer's weight average molecular weight described earlier. In particular, a preferable particle $P_{HRI}$ dispersion has a limited amount of polymer that exhibits rubber elasticity in a room temperature range (typically an adhesive polymer that can be used as base polymer of PSA). By this, particles $P_{HRI}$ can be well-incorporated in a suitable manner into the base PSA composition or the base PSA layer.

(Colorant)

The PSA layer can include a colorant. By this, the light transmission (light-blocking properties) of the PSA sheet can be adjusted. As the colorant, various materials can be used that can attenuate the light advancing inside the PSA layer by absorption. The colorant may have a color of, for instance, black, gray, red, blue, yellow, green, yellow-green, orange and purple. The PSA layer may include the colorant typically dispersed (possibly dissolved) in the components of the PSA layer. As the colorant, among heretofore known pigments and dyes, one, two or more species of materials capable of decreasing the total light transmittance can be used. The pigments include inorganic and organic pigments. Examples of the dyes include azo-based dyes, anthraquinone, quinophthalone, styryl, diphenylmethane, triphenylmethane, oxazine, triazine, xanthan, methane, azomethine, acridine, and diazine. The colorants can be used singly as one species or in a suitable combination of two or more species.

(Black Colorant)

A black colorant can be preferably used because it allows efficient adjustment to the light-blocking properties in a small amount. Specific examples of the black colorant include carbon black, graphite, aniline black, perylene black, cyanine black, activated carbon, molybdenum disulfide, chromium complexes, and anthraquinone-based colorants. For the black colorant, solely one species or a suitable combination of two or more species can be used.

(Carbon Black Particles)

In some preferable embodiments, the PSA layer comprises carbon black particles. As the carbon black particles, species generally called carbon black (furnace black, channel black, acetylene black, thermal black, lamp black, turpentine soot, etc.) can be used without particular limitations. As the carbon black particles, it is also possible to use surface-modified carbon black particles having a functional group such as carboxy group, amino group, sulfonate group and silicon-containing group (e.g., alkoxysilyl group, alkylsilyl group). Such surface-modified carbon black particles are also called self-dispersible carbon black with which dispersant addition may be unnecessary or the amount added can be reduced. For the carbon black particles, solely one species or a combination of two or more species can be used.

In an embodiment where the PSA layer comprises carbon black particles, the amount of a non-carbon-black colorant (i.e., a colorant other than carbon black particles) in the PSA layer is not particularly limited. It is, for instance, possibly below 13% by weight, preferably below 10% by weight, also possibly, for instance, below 5.0% by weight, or even below 3.0% by weight (e.g., below 2.0% by weight, or even below 1.0% by weight). The art disclosed herein can be preferably implemented in an embodiment in which the PSA layer is essentially free of a non-carbon-black colorant. As used herein, "essentially free of" means absence of deliberate addition. For instance, the amount in the PSA layer can be 0.3% by weight or less (e.g., 0.1% by weight or less, or typically 0.01% by weight or less).

A particulate colorant (pigment) can be preferably used because it allows efficient adjustment to the light-blocking properties in a small amount. In some preferable embodiments, a colorant (e.g., a particulate black colorant such as carbon black) having a mean particle diameter of about 10 nm or larger (e.g., about 30 nm or larger) can be used. The mean particle diameter can be, for instance, about 50 nm or greater, possibly about 100 nm or greater, about 150 nm or greater, about 200 nm or greater, about 250 nm or greater, or even about 300 nm or greater. The maximum mean particle diameter of the colorant is not particularly limited. For instance, it is about 3000 nm or less, or possibly about 1000 nm or less. From the standpoint of increasing the light-blocking properties, the colorant's mean particle diameter can be suitably about 500 nm or less, or preferably about 400 nm or less. In some embodiments, the colorant may have a mean particle diameter of, for instance, about 300 nm or less, about 250 nm or less, 200 nm or less, about 120 nm or less, or even about 100 nm or less.

Here, the mean particle diameter of a colorant refers to the median volume diameter, in particular, the particle diameter at the 50th percentile (the 50th-percentile particle diameter, which may be abbreviated as D50 hereinafter) in its size distribution obtained by a particle size meter based on laser scattering/diffraction. As the analyzer, for instance, product name MICROTRAC MT3000II available from Microtrac-BEL Corporation or a comparable product can be used.

In the art disclosed herein, the form of addition of a colorant (favorably a black colorant such as carbon black particles) to the PSA composition is not particularly limited. The colorant such as carbon black particles can be added to the PSA composition in the form of a dispersion in which the particles are dispersed in a dispersion medium. The dispersion medium forming the dispersion is not particularly limited. Examples include water (ion-exchanged water, reverse osmosis water, distilled water, etc.), various organic solvents (alcohols such as ethanol; ketones such as acetone; ethers such as butyl cellosolve, propylene glycol monomethyl ether acetate; esters such as ethyl acetate; aromatic hydrocarbons such as toluene; mixed solvents of these), and aqueous mixed solvents of water and these organic solvents. The dispersion may also comprise an aforementioned dispersant. By mixing the dispersion with a PSA composition, the PSA composition may also further comprise the dispersant while comprising the colorant (favorably a black colorant such as carbon black particles).

The amount of the colorant (favorably a black colorant such as carbon black particles) included is not particularly limited. It can be suitably selected in view of the PSA layer thickness, light-blocking properties to be obtained, required adhesive properties, etc. The colorant content of the PSA layer is suitably about 0.1% by weight or higher. From the standpoint of the light-blocking properties, it is preferably about 0.5% by weight or higher, more preferably about 1.0% by weight or higher, yet more preferably about 1.5% by weight or higher, or possibly about 2.0% by weight or higher. From the standpoint of obtaining greater light-blocking properties or color adjustment, in some embodiments, the colorant content can be, for instance, about 2.5% by weight or higher, or possibly even about 3.0% by weight or higher. The amount of the colorant (favorably a black colorant such as carbon black particles) included is possibly about 50% by weight or lower, or suitably about 30% by weight or lower. From the standpoint of the adhesive properties, etc., it is preferably about 10% by weight or lower. When the refractive index enhancement takes priority or when the adhesive properties such as bonding strength are of more importance, the amount of the colorant (favorably a black colorant such as carbon black particles) included is preferably about 7% by weight or lower, more preferably about 5.0% by weight or lower, or possibly even about 3.0% by weight or lower.

The colorant may be included throughout the thickness of the Region-A-containing PSA layer or locally in a certain thickness range of the PSA layer. The certain thickness range can be in the PSA layer's first face side, second face side or middle part. In some embodiments, the colorant (favorably a black colorant such as carbon black particles) is preferably included at least in a thickness range from the second face of the PSA layer to 50% of the PSA layer thickness. According to such an embodiment, because the particles $P_{HRI}$ in the PSA layer are less likely to interfere with coloring with the colorant, the PSA sheet may have greater designability. In such an embodiment, the thickness range from the first face to 50% of the PSA layer may include or may be free of a colorant.

In some embodiments, the colorant content in the $P_{HRI}$-concentrated region (Region A) may be about the same as or different from the colorant content in the region (base region) on the second face side of Region A. For instance, with a higher colorant content in the base region than in Region A, the coloring effect tends to be preferably obtained in the base region. In such an embodiment, the influence of the colorant on the first-face RI of the PSA layer can be reduced and the RI-increasing effect of particles $P_{HRI}$ can be suitably obtained.

The PSA composition disclosed herein may comprise a component that contributes to enhancement of the colorant dispersity. The dispersity enhancer can be, for instance, a polymer, oligomer, liquid resin or surfactant (anionic, cationic, nonionic or amphoteric surfactant). As the dispersity enhancer, solely one species or a combination of two or more species can be used. The dispersity enhancer is preferably dissolved in the PSA composition. The oligomer can be a low molecular weight polymer formed of monomers including one, two or more species of acrylic monomer as the examples shown earlier (e.g., an acrylic oligomer having a Mw below about $10 \times 10^4$, or preferably below $5 \times 10^4$). The liquid resin can be, for instance, a tackifier resin (typically, a rosin-based, terpene-based, or hydrocarbon-based tackifier resin, or the like, e.g., hydrogenated rosin methyl ester, etc.). Such a dispersity enhancer can inhibit uneven dispersion of the colorant (e.g., particulate black colorant such as carbon black) and further inhibit uneven coloring of the PSA layer. Therefore, a PSA sheet can be formed with a good appearance.

The way of adding the dispersity enhancer is not particularly limited. It may be included in a solution containing a colorant (favorably a black colorant such as carbon black particles) before added to the PSA composition; or it may be supplied to the PSA composition simultaneously with a colorant, or before or after colorant addition.

The amount of dispersity enhancer is not particularly limited. From the standpoint of reducing its influence on the adhesive properties (e.g., lowering of the cohesion), relative to the entire PSA layer, it is suitably about 20% by weight or less (preferably about 10% by weight or less, more preferably 7% by weight or less, e.g., about 5% by weight or less). In some embodiments, the amount of dispersity enhancer can be up to about 10-fold (preferably up to about 5-fold, e.g., up to about 3-fold) of the colorant's weight. On the other hand, from the standpoint of favorably obtaining the effect of dispersity enhancer, its amount is suitably about 0.2% by weight or more (typically about 0.5% by weight or more, preferably about 1% by weight or more) of the entire PSA layer. In some embodiments, the amount of dispersity enhancer can be at least about 0.2-fold (preferably at least about 0.5-fold, e.g., at least 1-fold) of the colorant's weight.

(Tackifier Resin)

The PSA layer in the art disclosed herein may include a tackifier resin. This can increase the peel strength of the PSA sheet. As the tackifier resin, one, two or more species can be used, selected among various known tackifier resins such as a phenolic tackifier resin, a terpene tackifier resin, a modified terpene tackifier resin, a rosin tackifier resin, a hydrocarbon tackifier resin, an epoxy tackifier resin, a polyamide tackifier resin, an elastomer tackifier resin, and a ketone tackifier resin.

Examples of the phenolic tackifier resins include terpene phenolic resins, hydrogenated terpene phenolic resins, alkylphenolic resins, and rosin phenolic resins.

The term "terpene phenolic resin" refers to a resin including a terpene residue and a phenol residue, and is inclusive of both a copolymer of a terpene and a phenol compound (terpene-phenol copolymer resin) and a phenol-modified homopolymer or copolymer of a terpene (phenol-modified terpene resin). Preferable examples of terpenes constituting such terpene phenolic resins include monoterpenes such as α-pinene, β-pinene, and limonene (including d-form, 1-form and d/1 form (dipentene)). The hydrogenated terpene phenolic resin has a structure obtained by hydrogenating such a terpene phenolic resin. Such a resin is sometimes referred to as a hydrogen-added terpene phenolic resin.

The alkylphenolic resin is a resin (oily phenolic resin) obtainable from an alkylphenol and formaldehyde. Examples of alkylphenol resins include novolac type and resole type resins.

A rosin phenolic resin is typically a phenol-modified product of rosins or various rosin derivatives (including rosin esters, unsaturated fatty acid-modified rosins, and unsaturated fatty acid-modified rosin esters) described later. Examples of the rosin phenolic resin include rosin phenolic resins obtained, for example, by a method of adding a phenol to a rosin or the rosin derivative with an acid catalyst and thermally polymerizing.

Examples of terpene-based tackifier resins include polymers of terpenes (typically monoterpenes) such as α-pinene, β-pinene, d-limonene, 1-limonene, and dipentene. The polymer may be a homopolymer of one type of terpene or a copolymer of two or more types of terpenes. The homopolymers of one type of terpene can be exemplified by an α-pinene polymer, β-pinene polymer, and a dipentene polymer. The modified terpene resin is exemplified by modifications of the terpene resin. Specific examples include styrene-modified terpene resins and hydrogenated terpene resins.

The term "rosin-based tackifier resin" as used herein is inclusive of both rosins and rosin derivative resins. Examples of rosins include unmodified rosins (raw rosins) such as gum rosin, wood rosin, and tall oil rosin, and modified rosins obtained by modification of the unmodified rosins by hydrogenation, disproportionation, polymerization, and the like (hydrogenated rosins, disproportionated rosins, polymerized rosins, and other chemically modified rosins).

The rosin derivative resin is typically a derivative of an aforementioned rosin. The term "rosin-based resin" as used herein is inclusive of derivatives of unmodified rosins and derivatives of modified rosins (including hydrogenated rosins, disproportionated rosins and polymerized rosins). Examples thereof include rosin esters such as unmodified rosin esters which are esters of unmodified rosins and alcohols, and modified rosin esters which are esters of modified rosins and alcohols; unsaturated fatty acid-modified rosins obtained by modification of rosins with unsaturated fatty acids; unsaturated fatty acid-modified rosin esters obtained by modification of rosin esters with unsaturated fatty acids; rosin alcohols obtained by reduction treatment of carboxy groups of rosins or various abovementioned rosin derivatives (including rosin esters, unsaturated fatty acid-modified rosins and unsaturated fatty acid-modified rosin esters); and metal salts of rosins or various abovementioned rosin derivatives. Specific examples of rosin esters include methyl esters, triethylene glycol esters, glycerin esters, and pentaerythritol esters of unmodified rosins or modified rosins (hydrogenated rosins, disproportionated rosins, polymerized rosins, and the like).

Examples of the hydrocarbon-based tackifier resin include various hydrocarbon resins such as aliphatic hydrocarbon resins, aromatic hydrocarbon resins, aliphatic cyclic hydrocarbon resins, aliphatic/aromatic petroleum resins (styrene-olefin copolymers and the like), aliphatic/alicyclic petroleum resins, hydrogenated hydrocarbon resin, coumarone resins, and coumarone indene resins.

The softening point of the tackifier resin is not particularly limited. From the standpoint of improving the cohesiveness, in some embodiments, a tackifier resin having a softening point (softening temperature) of about 80° C. or higher (preferably, about 100° C. or higher) can be preferably used. The art disclosed herein can be preferably implemented in an embodiment in which more than 50% by weight (more preferably, more than 70% by weight, for example, more than 90% by weight) of the total amount of the tackifier resin (taken as 100% by weight) contained in the PSA layer is taken by a tackifier resin having the abovementioned softening point. For example, a phenolic tackifier resin (terpene phenolic resin or the like) having such a softening point can be advantageously used. The tackifier resin may include, for example, a terpene phenolic resin having a softening point of about 135° C. or higher (furthermore, about 140° C. or higher). The upper limit of the softening point of the tackifier resin is not particularly limited. From the standpoint of improving the adhesion to an adherend, in some embodiments, a tackifier resin having a softening point of about 200° C. or lower (more preferably about 180° C. or lower) can be preferably used. The softening point of the tackifier resin can be measured based on a softening point test method (ring and ball method) prescribed in JIS K 2207.

In some preferable embodiments, the tackifier resin includes one or two or more phenolic tackifier resins (typically, a terpene phenolic resin). The art disclosed herein can be preferably implemented, for instance, in an embodiment where a terpene phenolic resin corresponds to about 25% by weight or more (more preferably, about 30% by weight or more) with the total amount of the tackifier resin being 100% by weight. About 50% by weight or more of the total amount of the tackifier resin may be a terpene phenolic resin, and about 80% by weight or more (e.g., about 90% by weight or more) may be a terpene phenolic resin. Substantially all of the tackifier resin (e.g., about 95% by weight to 100% by weight, even about 99% by weight to 100% by weight) may be a terpene phenolic resin.

While no particular limitations are imposed, in some embodiments, the tackifier resin may include a tackifier resin having a hydroxyl value higher than 20 mg KOH/g. Among such tackifier resins, a tackifier resin having a hydroxyl value of 30 mg KOH/g or more is preferable. Hereinafter, a tackifier resin having a hydroxyl value of 30 mg KOH/g or more may be referred to as a "high-hydroxyl-value resin". With the tackifier resin including such a high-hydroxyl-value resin, a PSA layer can be obtained that shows excellent adhesion to the adherend and high cohesive strength. In some embodiments, the tackifier resin may include a high-hydroxyl-value resin having a hydroxyl value of 50 mg KOH/g or higher (more preferably, 70 mg KOH/g or higher).

As the hydroxyl value, it is possible to use a value determined by the potentiometric titration method specified in JIS K0070:1992.

As the high-hydroxyl-value resin, a species having at least a prescribed hydroxyl value can be used among the various tackifier resins described earlier. The high-hydroxyl-value resins can be used singly as one species or in a combination of two or more species. For example, a phenolic tackifier resin having a hydroxyl value of 30 mgKOH/g or higher can be preferably used as the high-hydroxyl-value resin. In some preferable embodiments, a terpene phenolic resin having a hydroxyl value of 30 mgKOH/g or higher is used as the tackifier resin. The terpene phenolic resin is advantageous because the hydroxyl value can be controlled at will through the copolymerization ratio of phenol.

The maximum hydroxyl value of the high-hydroxyl-value resin is not particularly limited. From the standpoint of the compatibility with the base polymer and the like, the hydroxyl value of the high-hydroxyl-value resin is suitably about 200 mgKOH/g or lower, preferably about 180 mgKOH/g or lower, more preferably about 160 mgKOH/g or lower, and even more preferably about 140 mgKOH/g or lower. The art disclosed herein can be preferably implemented in an embodiment in which the tackifier resin includes a high-hydroxyl-value resin (e.g., a phenol-based tackifier resin, preferably a terpene phenolic resin) having a hydroxyl value of 30 mgKOH/g to 160 mgKOH/g. In some embodiments, a high-hydroxyl-value resin having a hydroxyl value of 30 mgKOH/g to 80 mgKOH/g (e.g., 30 mgKOH/g to 65 mgKOH/g) can be preferably used. In other embodiments, a high-hydroxyl-value resin having a hydroxyl value of 70 mgKOH/g to 140 mgKOH/g can be preferably used.

While no particular limitations are imposed, when a high-hydroxyl-value resin is used, the ratio of high-hydroxyl-value resin (e.g., a terpene phenolic resin) to the entire tackifier resin in the PSA layer can be, for example, about 25% by weight or higher, preferably about 30% by weight or higher, and more preferably about 50% by weight or higher (e.g., about 80% by weight or higher, typically about 90% by weight or higher). Substantially all of the tackifier resin (e.g., about 95% by weight to 100% by weight, more preferably about 99% by weight to 100% by weight) may be a high-hydroxyl-value resin.

When the PSA layer includes a tackifier resin, the amount of the tackifier resin used is not particularly limited, and may be suitably selected in a range of, for example, about 1 part to 100 parts by weight to 100 parts by weight of the base polymer. From the standpoint of favorably obtaining the effect to increase the peel strength, the amount of the tackifier resin used to 100 parts by weight of the base polymer (e.g., acrylic polymer) is suitably 5 parts by weight or greater, preferably 10 parts by weight or greater, or possibly 15 parts by weight or greater. From the standpoint of the impact resistance and cohesive strength, the amount of the tackifier resin used to 100 parts by weight of the base polymer (e.g., acrylic polymer) is suitably 50 parts by weight or less, possibly 40 parts by weight or less, or even 30 parts by weight or less.

(Crosslinking Agent)

In the art disclosed herein, the PSA composition used for forming the PSA layer may comprise a crosslinking agent as necessary. The type of crosslinking agent is not particularly limited and a suitable species can be selected and used among heretofore known crosslinking agents. Examples of the crosslinking agent include isocyanate-based crosslinking agents, epoxy-based crosslinking agents, oxazoline-based crosslinking agents, aziridine-based crosslinking agents, melamine-based crosslinking agents, peroxide-based crosslinking agents, urea-based crosslinking agents, metal alkoxide-based crosslinking agents, metal chelate-based crosslinking agents, metal salt-based crosslinking agents, carbodiimide-based crosslinking agents, hydrazine-based crosslinking agents, amine-based crosslinking agents, and silane coupling agents. Among them, isocyanate-based crosslinking agents, epoxy-based crosslinking agents, oxazoline-based crosslinking agents, aziridine-based crosslinking agents and melamine-based crosslinking agents are preferable; isocyanate-based crosslinking agents and epoxy-based crosslinking agents are more preferable; and isocyanate-based crosslinking agents are particularly preferable. The use of an isocyanate-based crosslinking agent tends to bring about impact resistance superior to other crosslinked matrices while obtaining the PSA layer's cohesive strength. For instance, it is also advantageous to use an isocyanate-based crosslinking agent in improving the adhesive strength to an adherend formed of polyester resin such as PET. For the crosslinking agent, solely one species or a combination of two or more species can be used.

As the isocyanate-based crosslinking agent, it is preferable to use a polyfunctional isocyanate (which refers to a compound having an average of two or more isocyanate groups per molecule, including a compound having an isocyanurate structure). For the isocyanate-based crosslinking agent, solely one species or a combination of two or more species can be used.

Examples of the polyfunctional isocyanate include aliphatic polyisocyanates, alicyclic polyisocyanates, and aromatic polyisocyanates.

Examples of an aliphatic polyisocyanate include 1,2-ethylene diisocyanate; tetramethylene diisocyanates such as 1,2-tetramethylene diisocyanate, 1,3-tetramethylene diisocyanate, 1,4-tetramethylene diisocyanate, etc.; hexamethylene diisocyanates such as 1,2-hexamethylene diisocyanate, 1,3-hexamethylene diisocyanate, 1,4-hexamethylene diisocyanate, 1,5-hexamethylene diisocyanate, 1,6-hexamethylene diisocyanate, 2,5-hexamethylene diisocyanate, etc.; 2-methyl-1,5-pentane diisocyanate, 3-methyl-1,5-pentane diisocyanate, and lysine diisocyanate.

Examples of an alicyclic polyisocyanate include isophorone diisocyanate; cyclohexyl diisocyanates such as 1,2-cyclohexyl diisocyanate, 1,3-cyclohexyl diisocyanate, 1,4-cyclohexyl diisocyanate, etc.; cyclopentyl diisocyanates such as 1,2-cyclopentyl diisocyanate, 1,3-cyclopentyl diisocyanate etc.; hydrogenated xylylene diisocyanate, hydrogenated tolylene diisocyanate, hydrogenated diphenylmethane diisocyanate, hydrogenated tetramethylxylene diisocyanate, and 4,4'-dicyclohexylmethane diisocyanate.

Examples of an aromatic polyisocyanate include 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, xylylene-1,4-diisocyanate, and xylylene-1,3-diisocyanate.

A preferable example of the polyfunctional isocyanate has an average of three or more isocyanate groups per molecule. Such a tri-functional or higher polyfunctional isocyanate can be a multimer (typically a dimer or a trimer), a derivative (e.g., an adduct of a polyol and two or more polyfunctional isocyanate molecules), a polymer or the like of a di-functional, tri-functional, or higher polyfunctional isocyanate. Examples include polyfunctional isocyanates such as a dimer and a trimer of a diphenylmethane diisocyanate, an isocyanurate (a cyclic trimer) of a hexamethylene diisocyanate, a reaction product of trimethylol propane and a tolylene diisocyanate, a reaction product of trimethylol propane and a hexamethylene diisocyanate, polymethylene polyphenyl isocyanate, polyether polyisocyanate, and polyester polyisocyanate. Commercially available polyfunctional isocyanates include product name DURANATE TPA-100 available from Asahi Kasei Chemicals Corporation and product names CORONATE L, CORONATE HL, CORONATE HK, CORONATE HX, and CORONATE 2096 available from Tosoh Corporation.

The amount of isocyanate-based crosslinking agent used is not particularly limited. For example, it can be about 0.5 part by weight or greater to 100 parts by weight of the base polymer. From the standpoint of combining cohesive strength with tightness of adhesion and of the impact resistance and so on, the amount of isocyanate-based crosslinking agent used to 100 parts by weight of the base polymer may be, for example, 1.0 part by weight or greater, or preferably 1.5 parts by weight or greater (typically 2.0 parts by weight or greater, e.g., 2.5 parts by weight or greater). From the standpoint of obtaining tighter adhesion to the adherend, the amount of the isocyanate-based crosslinking agent used is suitably 10 parts by weight or less, 8 parts by weight or less, or even 5 parts by weight or less (e.g., 3 parts by weight or less) to 100 parts by weight of the base polymer.

In some preferable embodiments, as the crosslinking agent, an isocyanate-based crosslinking agent is used in combination with at least one other species of crosslinking agent having a crosslinkable functional group different from that of the isocyanate-based crosslinking agent (or a "non-isocyanate-based crosslinking agent). According to the art disclosed herein, the combined use of isocyanate-based crosslinking agent and non-isocyanate-based crosslinking agent can bring about excellent cohesive strength. For instance, it can favorably combine high heat-resistant cohesive strength and excellent metal corrosion inhibition in an embodiment comprising a rust inhibitor such as azole-based rust inhibitor. The PSA layer in the art disclosed herein may include the crosslinking agent, for instance, in a crosslinked form, in a pre-crosslinked form, in a partially crosslinked form, in an intermediate or combined form of these. In typical, the crosslinking agent is included in the adhesive layer mostly in a crosslinked form.

There are no particular limitations to the type of non-isocyanate-based crosslinking agent that can be used in combination with the isocyanate-based crosslinking agent. A suitable species can be selected and used among the crosslinking agents described above. The non-isocyanate-based crosslinking agents can be used singly as one species or in a combination of two or more species.

In some preferable embodiments, an epoxy-based crosslinking agent can be used as the non-isocyanate-based crosslinking agent. For instance, with the combined use of isocyanate-based and epoxy-based crosslinking agents, cohesion is likely to be combined with impact resistance. As the epoxy-based crosslinking agent, a compound having two or more epoxy groups in a molecule can be used without particular limitation. An epoxy-based crosslinking agent having 3 to 5 epoxy groups in a molecule is preferable. Epoxy-based crosslinking agents can be used singly as one species or in a combination of two or more species.

Specific examples of the epoxy-based crosslinking agent include, but are not limited to, N,N,N,N-tetraglycidyl-m-xylenediamine, 1,3-bis(N,N-diglycidylaminomethyl)cyclohexane, 1,6-hexanediol diglycidyl ether, polyethylene glycol diglycidyl ether, and polyglycerol polyglycidyl ether. Examples of commercially available epoxy-based crosslinking agents include product names TETRAD-C and TETRAD-X both available from Mitsubishi Gas Chemical Co., Inc., product name EPICLON CR-5L available from DIC Corp., product name DENACOL EX-512 available from Nagase ChemteX Corporation, and product name TEPIC-G available from Nissan Chemical Industries, Ltd.

The amount of the epoxy-based crosslinking agent to be used is not particularly limited. The amount of the epoxy-based crosslinking agent to be used can be, for example, more than 0 part by weight and about 1 part by weight or less (typically about 0.001 part to 0.5 part by weight) to 100 parts by weight of the base polymer. From the standpoint of favorably obtaining the effect to increase the cohesive strength, the amount of epoxy-based crosslinking agent used is suitably about 0.002 part by weight or greater, preferably about 0.005 part by weight or greater, or more preferably about 0.008 part by weight or greater to 100 parts by weight of the base polymer. From the standpoint of obtaining tighter adhesion to an adherend, the amount of the epoxy-based crosslinking agent used is suitably about 0.2 part by weight or less, preferably about 0.1 part by weight or less, more preferably less than about 0.05 part by weight, or even more preferably less than about 0.03 part by weight (e.g., about 0.025 part by weight or less) to 100 parts by weight of the base polymer. With decreasing amount of epoxy-based crosslinking agent used, the impact resistance tends to improve.

In the art disclosed herein, the relative amounts of isocyanate-based crosslinking agent and non-isocyanate-based crosslinking agent (e.g., epoxy-based crosslinking agent) are not particularly limited. For instance, the amount of non-isocyanate-based crosslinking agent can be about $1/50$ or less of the amount of isocyanate-based crosslinking agent. From the standpoint of more favorably bringing about tight adhesion to the adherend and cohesive strength, the amount of non-isocyanate-based crosslinking agent is suitably about $1/75$ or less, preferably about $1/100$ or less (e.g., $1/150$ or less), possibly about $1/200$ or less, or even about $1/250$ or less of the amount of isocyanate-based crosslinking agent by weight. From the standpoint of favorably obtaining the effect of the combined use of isocyanate-based crosslinking agent and non-isocyanate-based crosslinking agent (e.g., epoxy-based crosslinking agent), the amount of the non-isocyanate-based crosslinking agent is suitably about $1/1000$ or more, for example, about $1/500$ or more of the amount of isocyanate-based crosslinking agent.

The total use (total amount) of crosslinking agent is not particularly limited. For instance, it can be about 10 parts by weight or less to 100 parts by weight of the base polymer (favorably an acrylic polymer) or selected from a range of preferably about 0.005 part to 10 parts by weight, or more preferably about 0.01 part to 5 parts by weight.

(Rust Inhibitor)

The PSA layer according to some preferable embodiments may include a rust inhibitor. As the rust inhibitor, an azole-based rust inhibitor can be preferably used. The rust-inhibitor-containing PSA layer is preferable in a case that requires metal corrosion inhibition such as when applied to a metal. A preferable azole-based rust inhibitor comprises an azole-based compound (a five-membered cyclic aromatic compound having two or more hetero atoms with at least one of which being a nitrogen atom) as an active ingredient. As the azole-based compound, a suitable species can be selected among those used heretofore as rust inhibitors for metals such as copper.

Examples of the azole-based compound include azoles such as imidazole, pyrazole, oxazole, isoxazole, thiazole, isothiazole, selenazole, 1,2,3-triazole, 1,2,4-triazole, 1,2,5-oxadiazole, 1,3,4-oxadiazole, 1,2,3-thiadiazole, 1,2,4-thiadiazole, 1,3,4-thiadiazole, tetrazole, and 1,2,3,4-thiatriazole; derivatives thereof; amine salts thereof; and metal salts thereof. Examples of azole derivatives include compounds having a structure including a condensed ring of an azole ring and another ring such as a benzene ring. Specific examples thereof include indazole, benzimidazole, benzotriazole (that is, 1,2,3-benzotriazole having a structure in which an azole ring of 1,2,3-triazole is condensed with a benzene ring), and benzothiazole, and derivatives thereof such as alkylbenzotriazoles (e.g., 5-methylbenzotriazole, 5-ethylbenzotriazole, 5-n-propylbenzotriazole, 5-isobutylbenzotriazole, and 4-methylbenzotriazole), alkoxybenzotriazoles (e.g., 5-methoxybenzotriazole), alkylaminobenzotriazoles, alkylaminosulfonylbenzotriazoles, mercaptobenzotriazole, hydroxybenzotriazole, nitrobenzotriazoles (e.g., 4-nitrobenzotriazole), halobenzotriazoles (e.g., 5-chlorobenzotriazole), hydroxyalkylbenzotriazoles, hydroxybenzotriazoles, aminobenzotriazoles, (substituted aminomethyl)-tolyltriazoles, carboxybenzotriazole, N-alkylbenzotriazoles, bisbenzotriazoles, naphthotriazoles, mercaptobenzothiazole, and aminobenzothiazole, amine salts thereof, and metal salts thereof. Other examples of azole derivatives include an azole derivative having a non-condensed ring structure, for example, compounds with a structure having a substituent on a non-condensed azole ring, for example, 3-amino-1,2,4-triazole and 5-phenyl-1H-tetrazole. The azole compounds can be used singly as one species or in a combination of two or more species.

Preferable examples of compounds that can be used as the azole-based rust inhibitor include benzotriazole-based rust inhibitors including a benzotriazole compound as an active ingredient. The art disclosed herein can be preferably implemented, for example, in an embodiment in which the base polymer is an acrylic polymer and the rust inhibitor is a benzotriazole-based rust inhibitor. In such an embodiment, a PSA sheet can be favorably obtained that provides satisfactory metal corrosion inhibition and excellent bonding reliability. Favorable examples of the benzotriazole-based compound include 1,2,3-benzotriazole, 5-methylbenzotriazole, 4-methylbenzotriazole, and carboxybenzotriazole.

Examples of the non-azole-based rust inhibitor possibly in the PSA layer disclosed herein are not particularly limited. Examples include amine compounds, nitrites, ammonium benzoate, ammonium phthalate, ammonium stearate, ammonium palmitate, ammonium oleate, ammonium carbonate, salts of dicyclohexylaminebenzoic acid, urea, urotropin, thiourea, phenyl carbamate, and cyclohexylammonium-N-cyclohexyl carbamate (CHC). These rust inhibitors which are not azole compounds (non-azole-based rust inhibitors) can be used singly as one species or in a combination of two or more species. Alternatively, the art disclosed herein can also preferably be implemented in an embodiment that uses essentially no non-azole-based rust inhibitor.

The amount of the azole-based rust inhibitor (favorably an azole-based rust inhibitor, e.g., a benzotriazole-based rust inhibitor) is not particularly limited, and can be, for example, 0.01 part by weight or greater (typically 0.05 parts by weight or greater) to 100 parts by weight of the base polymer. From the standpoint of obtaining greater inhibition of metal corrosion, the amount may be 0.1 part by weight or greater, 0.3 part by weight or greater, or 0.5 part by weight or greater. From the standpoint of increasing the cohesive strength of the PSA, the amount of rust inhibitor is suitably less than 8 parts by weight, possibly 6 parts by weight or less, or even 5 parts by weight or less to 100 parts by weight of the base polymer.

(Other Additives)

The PSA composition used for forming the PSA layer disclosed herein may include, as necessary, various additives which are common in the field of PSA compositions, such as a leveling agent, crosslinking aid, plasticizer, softener, antistatic agent, aging-preventing agent, UV absorber, antioxidant, and light stabilizer. As for these various additives, heretofore known species can be used by conventional methods, and the present invention is not particularly characterized thereby. Therefore, detailed description is omitted.

(Formation of PSA Layer)

The method for preparing the PSA layer disclosed herein is not particularly limited. It is possible to use various methods capable of preparing a PSA layer with Region A formed in the first face side.

The PSA layer disclosed herein can be prepared, for instance, by a wet-on-dry method (or WOD method, hereinafter) that comprises applying a particle $P_{HRI}$ dispersion to one face of a pre-formed PSA layer (a starting PSA layer). The WOD method can be preferably practiced in an embodiment where the particle $P_{HRI}$ dispersion is applied to the first face of the starting PSA layer and then allowed to dry. When the particle $P_{HRI}$ dispersion (high-RI particle dispersion) to the PSA layer's first face, the dispersion medium (typically an organic solvent) thereof causes swelling of the first face side. In this process, the particles $P_{HRI}$ in the dispersion permeate into the PSA layer. By allowing the dispersion medium to evaporate, a PSA layer can be obtained with a $P_{HRI}$-concentrated region (Region A) formed in the first face side. The starting PSA layer (the PSA layer before coated with the dispersion) may include particles $P_{HRI}$ (e.g., a small amount of particles $P_{HRI}$ throughout the entire thickness) or may be free thereof. From the standpoint of the adhesive properties, etc., the dispersion is preferably applied to a starting PSA layer essentially free of particles $P_{HRI}$.

The starting PSA layer can be formed by a conventionally known method. For instance, it is possible to use a method where a PSA composition is applied to a releasable surface (release face) and allowed to dry to form a PSA layer. For example, in an embodiment of the PSA sheet having a support substrate, a direct method can be used where the PSA composition is directly provided (typically applied) to the support substrate and allowed to dry to form a PSA layer. Alternatively, a transfer method can be employed where the PSA composition is provided to a releasable surface (e.g., a release face) and allowed to dry to form a PSA layer on the surface and the PSA layer is transferred to a support substrate. As the release face, for instance, the surface of a release liner described later can be preferably used.

As the method for coating the dispersion, a suitable method can be used such as roll coating, kiss roll coating, gravure coating, reverse coating, roll brushing, spray coating, dip roll coating, bar coating, knife coating, air knife coating, curtain coating, lip coating and die coating. The thickness $T_R$ can be controlled through the dispersion coating method, dispersion concentration, coating amount, etc.

While no particular limitations are imposed, the dispersion medium (the highest-content solvent by weight when the dispersion medium is a mixed solvent of two or more different kinds) of the particle $P_{HRI}$ dispersion used in the WOD method can be one, two or more species of organic solvents selected among aforementioned alcohols, ketones, ethers, esters, aromatic hydrocarbons, aliphatic hydrocarbons, amides and cellosolves. From the standpoint of the ease of solvent elimination during drying after the application of the particle $P_{HRI}$ dispersion and inhibition of PSA deterioration, it is preferable to use an organic solvent having a boiling point of about 130° C. or lower (more preferably about 110° C. or lower, e.g., about 90° C. or lower). For easy control of the Region A thickness, it is preferable to use an organic solvent having a boiling point of about 50° C. or higher (more preferably about 60° C. or higher, e.g., about 70° C. or higher). When a solvent-based PSA composition is used to form the starting PSA layer, the solvent thereof can be the same as or different from the dispersion medium of the particle $P_{HRI}$ dispersion.

In forming the PSA layer by the WOD method, the Region A thickness $T_A$ depends on the relationship between the PSA composition used to form the starting PSA layer and the dispersion medium of the high-RI particle dispersion (particle $P_{HRI}$ dispersion). The dispersion medium can be suitably selected to obtain a desirable thickness $T_A$. The coating amount of the dispersion can also be suitably set to result in a desirable thickness $T_A$.

While no particular limitations are imposed, for instance, when ethyl acetate is the solvent (the highest-content solvent by weight in case of a mixed solvent of two or more different kinds) of the solvent-based PSA composition used to form the starting PSA layer, as for the dispersion medium of the particle $P_{HRI}$ dispersion, an alcohol such as ethanol or a ketone such as MEK can be preferably selected. From the standpoint of better minimizing the decrease in adhesive strength due to the formation of Region A, alcohols such as ethanol are more preferable.

As for another example of the method for forming the PSA layer having Region A in the first face side, the PSA layer can be preferably formed by a wet-on-wet method (or WOW method, hereinafter) that comprises, for instance, applying a base PSA composition comprising base polymer and a dispersion comprising particles $P_{HRI}$ (particle $P_{HRI}$ dispersion) by wet-on-wet coating. The wet-on-wet coating refers to layering of applications of the base PSA composition and the particle $P_{HRI}$ dispersion both in liquid states (flowable states). The application order is not particularly limited. The particle $P_{HRI}$ dispersion can be applied after the base PSA composition is applied; or the base PSA composition can be applied after the particle $P_{HRI}$ dispersion is applied. For easy production, it is preferable to use a method in which the particle $P_{HRI}$ dispersion is applied after the base PSA composition.

When the base PSA composition and the particle $P_{HRI}$ dispersion are applied wet-on-wet, the particle $P_{HRI}$ dispersion blends into one side of the applied base PSA composition (the side in contact with the applied particle $P_{HRI}$ dispersion). By allowing the resulting coating to cure before the particles $P_{HRI}$ originating from the particle $P_{HRI}$ dispersion diffuse through to the opposite side of the applied base PSA composition, it is possible to form a PSA layer with Region A formed in the one side (first face side). The resulting coating can be cured by one, two or more curing treatments such as drying (typically evaporation of volatiles such as organic solvents), polymerization of unreacted monomers and cooling from the molten state. When performing two or more different curing treatments, these can be carried out simultaneously or stepwise.

A preferable base PSA composition is such that the weight fraction W2 (% by weight) of particles $P_{HRI}$ in its cured product (e.g., the dry weight for a solvent-based PSA composition) is lower than the weight fraction W1 (% by weight) of particles $P_{HRI}$ in the dry weight of the particle $P_{HRI}$ dispersion used in the wet-on-wet coating along with the composition. In other words, the weight fraction W2 to weight fraction W1 ratio (W2/W1) is below 1.0 in a preferable base PSA composition. The W2/W1 ratio value is more preferably below 0.5 (e.g., below 0.2), below 0.1, below 0.05, below 0.01, or even 0.00.

The weight fraction W2 is preferably below 10% by weight (e.g., below 5% by weight), possibly below 1% by weight, below 0.5% by weight, or even below 0.1% by weight. In some embodiments, a base PSA composition essentially free of particles $P_{HRI}$ can be preferably used. Here, that the base PSA composition is essentially free of particles $P_{HRI}$ means at least absence of deliberate inclusion of particles $P_{HRI}$ in the base PSA composition. In such a base PSA composition, the weight fraction W2 can be in the range of, for instance, 0% by weight or higher and below 0.005% by weight.

While no particular limitations are imposed, the dispersion medium of the particle $P_{HRI}$ dispersion used in the WOW method can be one, two or more species of organic solvents selected among aforementioned alcohols, ketones, ethers, esters, aromatic hydrocarbons, aliphatic hydrocarbons, amides and cellosolves. When a solvent-based PSA composition is used as the base PSA composition, the solvent thereof can be the same as or different from the dispersion medium of the particle $P_{HRI}$ dispersion. In some embodiments, for easy control of the Region A thickness $T_A$, the difference in boiling point between the dispersion medium (the highest-content solvent by weight in case of a mixed solvent of two or more different kinds) of the particle $P_{HRI}$ dispersion and the solvent (the highest-content solvent by weight in case of a mixed solvent of two or more different kinds) of the base PSA composition is preferably about 50° C. or less, more preferably about 30° C. or less, or even more preferably about 20° C. or less.

From the standpoint of the ease of solvent elimination by drying and inhibition of PSA deterioration, in some embodiments, the dispersion medium of the particle $P_{HRI}$ dispersion and the solvent of the base PSA composition can be independently selected among organic solvents having boiling points of about 130° C. or lower (more preferably about 110° C. or lower, e.g., about 90° C. or lower). For easy control of the PSA layer thickness $T_0$, in some embodiments, the dispersion medium of the particle $P_{HRI}$ dispersion and the solvent of the base PSA composition can be independently selected among organic solvents having boiling points of about 50° C. or higher (more preferably about 60° C. or higher, e.g., about 70° C. or higher).

In forming the PSA layer by the WOW method, the Region A thickness $T_A$ can be adjusted through the relationship between the composition of the base PSA composition and the dispersion medium of the high-RI particle dispersion (particle $P_{HRI}$ dispersion). The dispersion medium can be suitably selected to obtain a desirable thickness $T_A$. The coating amount of the dispersion can also be suitably set to result in a desirable thickness $T_A$.

While no particular limitations are imposed, for instance, when a solvent-based PSA composition is used as the base PSA composition and ethyl acetate is the solvent (the highest-content solvent by weight in case of a mixed solvent of two or more different kinds) of the solvent-based PSA composition, as for the dispersion medium of the particle $P_{HRI}$ dispersion, an alcohol such as ethanol or a ketone such as MEK can be preferably selected. Because the resulting PSA layer is likely to have Region A with a suitable thickness (e.g., 300 nm or greater) for decreasing the wavelength dependence of refractive index, a particle $P_{HRI}$ dispersion whose dispersion medium is a ketone such as MEK is more preferable.

The form of the PSA composition used for preparing the PSA layer disclosed herein (possibly by the WOW, WOD or other method) is not particularly limited, with examples including an aqueous PSA composition, solvent-based PSA composition, hot-melt PSA composition, or active energy ray-curable PSA composition which cures upon irradiation of active energy rays such as UV rays and electron beam. The aqueous PSA composition refers to a PSA composition that comprises a PSA (PSA layer-forming components) in a solvent whose primary component is water (an aqueous solvent), typically including a so-called water-dispersed PSA composition (in which the PSA is at least partially dispersed in water). Further, the solvent-based PSA composition refers to a PSA composition that comprises a PSA in an organic solvent. As the organic solvent in the solvent-based PSA composition, among the examples (toluene, ethyl acetate, etc.) of the organic solvent possibly used in the solution polymerization, one, two or more species can be used without particular limitations. From the standpoint of the permeation of particles $P_{HRI}$ from the first face to the inside, a solvent-based PSA composition can be preferably used as the PSA composition for forming the starting PSA layer.

The PSA composition can be applied with a heretofore known coater, for instance, a gravure roll coater, die coater, and bar coater. Alternatively, the PSA composition can be applied by immersion, curtain coating, etc.

From the standpoints of accelerating the crosslinking reaction, improving production efficiency, and the like, it is preferable to dry the PSA composition under heating. The drying temperature can be, for example, about 40° C. to 150° C., and preferably about 60° C. to 130° C. Mier dried, the PSA composition can be subjected to aging to adjust the distribution or migration of components within the PSA layer, to allow the crosslinking reaction to proceed, to reduce possible distortion in the PSA layer, and so on.

The thickness $T_0$ of the PSA layer disclosed herein is not particularly limited. From the standpoint of preventing the PSA sheet from becoming excessively thick, the thickness $T_0$ of the PSA layer is suitably about 100 μm or less, preferably about 70 μm or less, and more preferably about 50 μm or less (e.g., about 30 μm or less). The PSA layer's thickness $T_0$ can be about 35 μm or less, for instance, about 25 μm or less, even about 15 μm or less. The PSA layer with a limited thickness may well accommodate needs for thinning and weight saving. The minimum thickness $T_0$ of the PSA layer is not particularly limited. From the standpoint of the tightness of adhesion to an adherend, it is advantageously about 1 μm or greater, suitably about 3 μm or greater, preferably about 5 μm or greater, more preferably about 7 μm or greater, yet more preferably about 12 μm or greater (e.g., about 15 μm or greater), particularly preferably about 20 μm or greater, possibly about 30 μm or greater, about 35 μm or greater, or even about 40 μm or greater. Having at least a certain thickness, it is possible to preferably obtain desirable adhesive properties with limited light transmission (e.g., light-blocking properties). With the PSA layer having at least a prescribed thickness, superior impact resistance is likely to be obtained.

<Support Substrate>

In an embodiment of the PSA sheet disclosed herein as an adhesively single-faced or double-faced substrate-supported PSA sheet, as the substrate supporting (backing) the PSA layer(s), it is possible to use a resin film, paper, cloth, rubber sheet, foam sheet, metal foil, composite of these, etc. Examples of the resin film include polyolefinic film such as polyethylene (PE), polypropylene (PP), and an ethylene-propylene copolymer; polyester film such as polyethylene terephthalate (PET); vinyl chloride resin film; vinyl acetate resin film; polyimide resin film; polyamide resin film; fluororesin film; and cellophane. Examples of the paper include Washi paper, kraft paper, glassine paper, high-grade paper, synthetic paper and top-coated paper. Examples of the cloth include woven fabrics and non-woven fabrics formed of one species or a blend of various fibrous substances. Examples of the fibrous substances include cotton, staple fiber, Manila hemp, pulp, rayon, acetate fiber, polyester fiber, polyvinyl alcohol fiber, polyamide fiber and polyolefin fiber. Examples of the rubber sheet include a natural rubber sheet and a butyl rubber sheet. Examples of the foam sheet include a polyurethane foam sheet and a polychloroprene rubber foam sheet. Examples of the metal foil include aluminum foil and copper foil.

The concept of nonwoven fabric here primarily refers to non-woven fabric for PSA sheets used in the field of PSA tape and other PSA sheets, typically referring to nonwoven fabric (or so-called "paper") fabricated using a general paper machine.

As the support substrate forming the substrate-supported PSA sheet, it is preferable to use a substrate comprising a resin film as the base film. The base film is typically a component capable of maintaining the shape by itself (a self-standing member). The support substrate in the art disclosed herein may be essentially formed of such a base film. Alternatively, the support substrate may include a supplemental layer in addition to the base film. Examples of the supplemental layer include a colored layer, a reflective layer, a primer layer and an anti-static layer formed on the surface of the base film.

The resin film comprises a resin material as the primary component (a component accounting for more than 50% by weight of the resin film). Examples of the resin film include polyolefinic resin film such as polyethylene (PE), polypropylene (PP), and ethylene-propylene copolymer; polyester-based resin film such as polyethylene terephthalate (PET), polybutylene terephthalate (PBT), and polyethylene naphthalate (PEN); vinyl chloride-based resin film; vinyl acetate-based resin film; polyimide-based resin film; polyamide-based resin film; fluororesin film; and cellophane. The resin film can also be a rubber-based film such as natural rubber film and butyl rubber film. In particular, from the standpoint of the handling properties and the ease of processing, polyester films are preferable and among them PET film is particularly preferable. As used herein, the "resin film" typically refers to a non-porous sheet and should be conceptually distinguished from so-called non-woven and woven fabrics (i.e., the concept excludes non-woven and woven fabrics). The resin film can be an unstretched film, uniaxially-stretched film or biaxially-stretched film.

The support substrate (e.g., resin film) can include a colorant. This allows adjustment to the light transmission (light-blocking properties) of the support substrate. Adjusting the support substrate's light transmission (e.g., vertical light transmittance) may help adjust the light transmission of the support substrate and further the light transmission of a PSA sheet comprising the substrate.

As the colorant, similar to the colorant that can be included in the PSA layer, various pigments and dyes can be used. The colorant is not particularly limited in color. The colorant can be, for instance, black, gray, white, red, blue, yellow, green, yellow-green, orange, purple, gold, silver and pearl.

In some embodiments, as the support substrate colorant, a black colorant can be preferably used for its ability to efficiently adjust the light-blocking properties (e.g., vertical light transmittance) in a small amount. Specific black colorants include the examples of the colorant possibly included in the PSA layer. In some preferable embodiments, it is possible to use a pigment (e.g., a particulate black colorant such as carbon black) having a mean particle diameter of 10 nm to 500 nm, or more preferably 10 nm to 120 nm.

The amount of colorant used in the support substrate (e.g., resin film) is not particularly limited. It can be used in an amount suitably adjusted to provide desirable optical properties. The amount of colorant used is suitably about 0.1% to 30% of the weight of the support substrate. For instance, it can be 0.1% to 25% (typically 0.1% to 20%) by weight.

To the support substrate (e.g., resin film), various additives can be added as necessary, such as fillers (inorganic and organic fillers, etc.), dispersing agent (surfactant, etc.), anti-aging agent, antioxidant, UV absorber, anti-static agent, slip agent and plasticizer. These various additives are added in amounts equivalent to about less than 30% by weight (e.g., less than 20% by weight, typically less than 10% by weight).

The support substrate (e.g., resin film) may have a monolayer structure or a multilayer structure with two, three or more layers. From the standpoint of the shape stability, the support substrate preferably has a monolayer structure. In case of a multilayer structure, at least one layer (preferably each layer) preferably has a continuous structure formed of the resin (e.g., a polyester-based resin). The method for producing the support substrate (typically a resin film) is not particularly limited and a heretofore known method can be suitably employed. For instance, heretofore known general film-forming methods can be suitably employed, such as extrusion, inflation molding, T-die casting, and calender rolling.

The support substrate can be colored with a colored layer placed on the surface of the base film (preferably a resin film). In the support substrate in such an embodiment including the base film and colored layer, the base film may or may not include a colorant. The colored layer can be placed on one or each face of the base film. In an embodiment having a colored layer on each face of the base film, the respective colored layers may be the same or different in constitution.

Such a colored layer can be typically formed by applying a colored layer-forming composition to a base film, the composition comprising a colorant and a binder. As the colorant, heretofore known pigments and dyes can be used, similar to the colorants that can be included in the PSA layer and resin film. As the binder, materials known in the paint or printing field can be used without particular limitations. Examples include polyurethane, phenol resin, epoxy resin, urea-melamine resin and polymethyl methacrylate. The colored layer-forming composition can be, for instance, a solvent-based type, UV-curable type, heat-curable type, etc. The colored layer can be formed by a conventional colored layer-forming method without particular limitations. For instance, it is preferable to use a method where the colored layer (printed layer) is formed by gravure printing, flexographic printing, offset printing, etc.

The colored layer may have a monolayer structure formed entirely of a single layer or a multilayer structure including two, three or more colored sublayers. For instance, a colored layer having a multilayer structure with two or more colored sublayers can be formed by repeated applications (e.g., printing) of a colored layer-forming composition. The respective colored sublayers may be the same or different in color and amount of colorant. In a colored layer to provide light-blocking properties, from the standpoint of preventing formation of pinholes to increase the reliability of light leakage prevention, a multilayer structure is particularly significant.

The colored layer has a total thickness of suitably about 1 μm to 10 μm, preferably about 1 μm to 7 μm, or possibly, for instance, about 1 μm to 5 μm. In the colored layer including two or more colored sublayers, each sublayer preferably has a thickness of about 1 μm to 2 μm.

The support substrate's thickness is not particularly limited. From the standpoint of avoiding too thick a PSA sheet, the support substrate's thickness can be, for instance, about 200 μm or less (e.g., about 100 μm or less). In accordance with the purpose and application of the PSA sheet, the support substrate may have a thickness of about 70 μm or less, about 30 μm or less, or even about 15 μm or less (e.g., about 8 μm or less). The minimum thickness of the support substrate is not particularly limited. From the standpoints of the handling properties and ease of processing of the PSA sheet, the support substrate has a thickness of suitably about 2 μm or greater, preferably about 5 μm or greater, for instance, about 10 μm or greater.

The surface of the support substrate may be subjected to heretofore known surface treatments such as corona discharge treatment, plasma treatment, UV irradiation, acid treatment, base treatment, and primer coating. Such a surface treatment may increase the tightness of adhesion between the support substrate and the PSA layer. In other words, it may improve the anchoring of the PSA layer to the support substrate.

When the art disclosed herein is made as a substrate-supported adhesively single-faced PSA sheet, the backside of the support substrate may be subjected to a release treatment as necessary. In the release treatment, for instance, a general silicone-based, long-chain alkyl-based or fluorine-based release agent is applied typically in a thin layer measuring about 0.01 μm to 1 μm (e.g., 0.01 μm to 0.1 μm). Such a release treatment can be provided to bring about easier unwinding of a roll formed by winding the PSA sheet and other effects.

<Release Liner>

In the art disclosed herein, a release liner can be used in formation of the PSA layer, preparation of the PSA sheet, storage, distribution and processing of the unused PSA sheet, etc. The release liner is not particularly limited, and examples thereof include a release liner having a release layer on the surface of a liner substrate such as a resin film or paper, and a release liner made of a low-adhesive material such as a fluoropolymer (polytetrafluoroethylene, etc.) or a polyolefin resin (polyethylene, polypropylene, etc.). The release layer can be formed, for example, by subjecting the liner substrate to surface treatment with a release agent such as a silicone-based, long-chain alkyl-based, fluorine-based agent kind, or molybdenum sulfide.

<Total thickness of PSA Sheet>

The total thickness of the PSA sheet disclosed herein (including PSA layer(s) and a support substrate if any, but not a release liner) is not particularly limited. The total thickness of the PSA sheet can be, for example, about 300 µm or less. From the standpoint of thickness reduction, it is suitably about 200 µm or less, or possibly even about 100 µm or less (e.g., about 70 µm or less). Although the minimum thickness of the PSA sheet is not particularly limited, it is possibly about 1 µm or greater, for instance, suitably about 3 µm or greater, preferably about 6 µm or greater, or more preferably about 10 µm or greater (e.g., about 15 µm or greater). The PSA sheet having at least a certain thickness is easily handled and tends to provide superior adhesion and impact resistance. It is noted that in a substrate-free PSA sheet, the PSA layer's thickness is the total thickness of the PSA sheet.

In some preferable embodiments, the thickness of the PSA sheet can be about 50 µm or less, for instance, about 35 µm or less, about 25 µm or less, even about 15 µm or less, or about 10 µm or less (e.g., about 7 µm or less). Although no particular limitations are imposed, the above PSA sheet's thickness can be preferably applied to a substrate-free double-faced PSA sheet. According to the art disclosed herein, good light-blocking properties can be obtained even in such a thin embodiment. The minimum thickness of the substrate-free double-faced PSA sheet can be about 1 µm or greater. From the standpoint of the adhesive properties such as adhesive strength, it is suitably about 3 µm or greater (e.g., 5 µm or greater), preferably about 8 µm or greater, or more preferably about 12 µm or greater (e.g., about 15 µm or greater). From the standpoint of the adhesion and impact resistance, it is yet more preferably about 20 µm or greater, possibly about 30 µm or greater, about 35 µm or greater, or even about 40 µm or greater.

<Applications>

The PSA sheet disclosed herein is suitable for applications to materials having limited light transmission and higher refractive indices than general PSA. For instance, some electronics such as portable electronic devices include luminous components for image displays, etc.; and therefore, limited light transmission (e.g., light-blocking properties) may be needed in the PSA sheet. With respect to such electronics, the PSA sheet disclosed herein is favorable.

Non-limiting examples of the portable electronic device include cell phones, smartphones, tablet PCs, notebook PCs, various wearable devices (e.g., wrist wears put on wrists such as wrist watches; modular devices attached to bodies with a clip, strap, etc.; eye wears including glass-shaped wears (monoscopic or stereoscopic, including head-mounted pieces); clothing types worn as, for instance, accessories on shirts, socks, hats/caps, etc.; ear wears such as earphones put on ears; etc.), digital cameras, digital video cameras, acoustic equipment (portable music players, IC recorders, etc.), calculators (e.g., pocket calculators), hand-held game devices, electronic dictionaries, electronic notebooks, electronic books, vehicle navigation devices, portable radios, portable TVs, portable printers, portable scanners, and portable modems. As used herein, being "portable" means not just providing simple mobility, but further providing a level of portability that allows an individual (average adult) to carry it relatively easily.

Among these portable electronic devices, in a portable electronic device having a pressure sensor, the PSA sheet disclosed herein can be preferably used for fixing the pressure sensor and other components. In some preferable embodiments, the PSA sheet can be used for fixing a pressure sensor and other components in an electronic device (typically, a portable electronic device) equipped with a function to identify an absolute position on a panel corresponding to a screen (typically, a touch panel) with a device to specify the position on the screen (typically, a pen type or a mouse type device) and a device to detect the position.

The PSA sheet disclosed herein is suitable for an application in which it is placed on the back of a display (screen) such as a touch panel display in a portable electronic device to prevent light reflection on the display screen. Placement of the PSA sheet disclosed herein on the back of the display (screen) can prevent degradation of display visibility regardless of how the portable electronic device is used. The refection may be caused by a metallic component placed on the backside of the display screen. For instance, when the PSA sheet disclosed herein is used for the metallic component and the screen, light-blocking properties can be obtained along with attachment of the components.

The PSA sheet disclosed herein is suitable for a portable electronic device comprising an optical sensor. Various devices such as the aforementioned sort of portable electronic devices may have optical sensors using light such as IR light, visible light and UV light for purposes including device operation, nearby object detection, detection of the surrounding brightness (ambient light) and data communication. While no particular limitations are imposed, examples of the light sensor include an accelerometer, proximity sensor and brightness sensor (ambient light sensor). Such optical sensors have photodetector elements for light such as UV light, visible light and LR light and may also have emitters for specific light such as IR light. In other words, the optical sensor may include an emitter and/or a photodetector element for light in a specific wavelength range in the wavelength spectrum including UV light, visible light and IR light. The art disclosed herein can be applied to such a device to reduce reflection of the light used in the optical sensor, thereby preventing deterioration of sensor accuracy.

Examples of the material (adherend material) to which the PSA sheet disclosed herein is applied include, but are not limited to, metals such as copper, silver, gold, iron, tin, palladium, aluminum, nickel, titanium, chromium, zinc and an alloy of two or more species among these; various resin materials (typically, plastic materials) such as polyimide resin, acrylic resin, polyether nitrile resin, polyether sulfone resin, polyester resin (PET resin, polyethylene naphthalate resin, etc.), polyvinyl chloride resin, polyphenylene sulfide resin, polyether ether ketone resin, polyamide resin (so-called aramid resin, etc.), polyarylate resin, polycarbonate resin, and liquid crystal polymer; inorganic materials such as alumina, zirconia, soda glass, silica glass and carbon. Among them, metals such as copper, aluminum, and stainless steel, and resin materials (typically plastic materials) such as polyester resin (PET resin, etc.), polyimide resin, aramid resin and polyphenylene sulfide resin are widely used. The material may constitute a member of a product such as an electronic device. The PSA sheet disclosed herein can be applied to a member formed from the material. The material may constitute an article to be fixed (e.g., a backside member such as an electromagnetic wave shield and a reinforcing sheet) in the pressure sensor, screen, etc. The article to be fixed refers to the target object to which the PSA sheet is applied, that is, the adherend. For instance, in a portable electronic device, the backside member refers to a member placed on the opposite side to the front face (visible side) of the pressure sensor or screen. The article to be fixed may have a single layer structure or a multilayer structure, and its surface (face to be attached) to which the PSA sheet is applied may be subjected to various types of surface treatment. The article to be fixed is not particularly limited. One example is a backside component having a thickness of about 1 µm or greater (typically, 5 µm or greater, for example, 60 µm or greater, and also 120 µm or greater) and about 1500 µm or less (e.g., 800 µm or less), but these values are not particularly limiting.

The member or material as an application target for the PSA sheet disclosed herein (at least one adherend for a double-faced PSA sheet) may be formed of a material having a higher refractive index than general PSAs. The adherend material has a refractive index of, for instance, 1.50 or higher. Certain adherend materials have refractive indices of 1.58 or higher and some of them even have refractive indices of 1.62 or higher (e.g., about 1.66). Adherend materials having such high refractive indices are typically resin materials. More specifically, it can be polyester-based resin such as PET, polyimide-based resin, aramid resin, polyphenylene sulfide-based resin, polycarbonate-based resin, etc. With such materials, the effect of using the PSA sheet disclosed herein (i.e., reduction of light reflection due to the difference in refractive index) can be preferably exhibited. The maximum refractive index of the adherend material is, for instance, 1.80 or lower, or possibly 1.70 or lower. The PSA sheet disclosed herein can be preferably used when applied to an adherend (e.g., a member) having a high refractive index as described above. Favorable examples of such adherends include a resin film having a refractive index of 1.50 to 1.80 (preferably 1.60 to 1.70). The refractive index can be determined by the same method as for the refractive index of the PSA layer surface.

The difference in refractive index is suitably less than 0.18 between the member or material as the application target for the PSA sheet (i.e., at least one adherend for a double-faced PSA sheet) and the first face (to be applied to the target) of the PSA layer in the PSA sheet. This preferably reduces light reflection at the interface between the adherend and the PSA sheet. The difference in refractive index is preferably less than 0.12, more preferably less than 0.10, yet more preferably less than 0.08, or particularly preferably less than 0.05. Theoretically, the difference in refractive index is zero (±0.00); however, it can be practically allowed to have a difference of about 0.01 or greater (e.g., 0.03 or greater).

Based on the above, the art disclosed herein provides a laminate having a PSA sheet disclosed herein and a member to which the PSA sheet is adhered. The member to which the PSA sheet is adhered may have a refractive index comparable to that of the adherend material described above. The difference in refractive index between the member and the first face (to be applied to the member) of the PSA sheet can be comparable to that between the adherend and the PSA sheet described above. The member constituting the laminate is as described above, regarded as the member, material and adherend. Thus, redundant details are not repeated.

The PSA sheet disclosed herein is limited in light transmission and a preferable embodiment thereof can have excellent light-blocking properties; and therefore, it is preferably used in electronic devices that include various light sources such as LED (light-emitting diodes) and luminous components such as self-luminous organic EL (electroluminescence). For instance, it can be preferably used in an electronic device (typically a portable electronic device) having a liquid crystal display that requires certain optical properties. More specifically, it can be preferably used in a liquid crystal display having a liquid crystal display module unit (LCD unit) and a backlight module unit (BL unit) to join the LCD and BL units.

Figure 5:
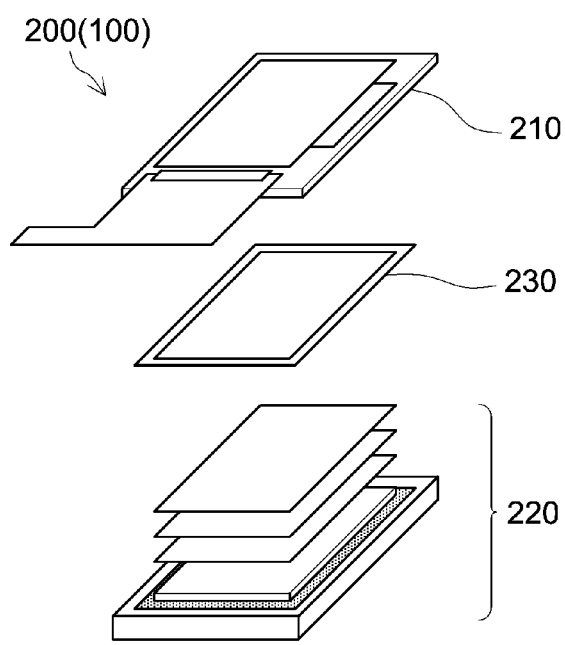
FIG. 5 shows an exploded perspective view schematically illustrating a constitutional example of a liquid crystal display.

FIG. 5 shows an exploded perspective view schematically illustrating a constitutional example of the liquid crystal display. As shown in FIG. 5, a liquid crystal display 200 having a portable electronic device 100 comprises an LCD unit (component) 210 and a BL unit (component) 220. Liquid crystal display 200 further comprises a PSA sheet 230. In this constitutional example, PSA sheet 230 is in a form of an adhesively double-faced PSA sheet (double-faced PSA sheet) processed into a frame shape and is placed between BL unit 220 and LCD unit 210 joining the two. It is noted that BL unit 220 typically includes, besides a light source, a reflective sheet, a light-guiding panel, a diffusion sheet, a prism sheet, etc.

The PSA sheet disclosed herein can be processed into joints having various shapes and used, for instance, for joining the LCD and BL units as well as for other joining purposes. In a preferable embodiment, the joint has a narrow segment having a width less than 2.0 mm (e.g., less than 1.0 mm). The PSA sheet according to some preferable embodiments may show excellent light-blocking properties. Thus, it can produce good performance even when used as a joint having a shape (e.g., a frame shape) with such a narrow segment. In some embodiments, the narrow segment may have a width of 0.7 mm or less, 0.5 mm or less, or even about 0.3 mm or less. The minimum width of the narrow segment is not particularly limited. From the standpoint of the handling properties of the PSA sheet, it is suitably 0.1 mm or greater (typically 0.2 mm or greater).

The narrow segment is typically linear. Here, the concept of being linear encompasses shapes that are straight, curved, bent (e.g., L-shaped) and also ring-shaped (frame-shaped, circular, etc.) as well as their composite or intermediate shapes. The ring shape is not limited to a curved shape. The concept encompasses, for instance, a ring shape of which part or all is straight, such as a shape that conforms to the circumference of a square (i.e., a frame shape) and a shape that conforms to a sector shape. The narrow segment is not particularly limited in length. For instance, in an embodiment where the narrow segment has a length of 10 mm or greater (typically 20 mm or greater, e.g., 30 mm or greater), the effect of the art disclosed herein can be favorably obtained.

The matters disclosed by this description include the following:

(1) A liquid crystal display having a liquid crystal display module unit, a backlight module unit, and an adhesively double-faced PSA sheet joining the liquid crystal display module unit and the backlight module unit, wherein
    the PSA sheet has a total light transmittance below 80%;
    the PSA layer has a first face and a second face on the opposite side to the first face;
    the PSA layer comprises high-RI particles; and
    in the PSA layer, the high-RI particles are concentrated in a range that extends from the first face towards the second face side and has a thickness of at least 100 nm, accounting for less than 50% of the PSA layer thickness.

(2) The liquid crystal display according to (1) above, comprising an optical sensor that comprises an emitter and/or a photodetector element for light in a specific wavelength range in the wavelength spectrum including UV light, visible light and IR light.

(3) The liquid crystal display according to (1) or (2) above, wherein the PSA sheet is an adhesively double-faced PSA sheet that consists of the PSA layer and is free of a substrate.
(4) The liquid crystal display according to any of (1) to (3) above, wherein the PSA sheet has a total light transmittance of 10% or lower.
(5) The liquid crystal display according to any of (1) to (4) above, wherein the first face is higher in refractive index by at least 0.05 than the second face.
(6) The liquid crystal display according to any of (1) to (5) above, wherein the first face has a refractive index of 1.50 or higher.
(7) The liquid crystal display according to any of (1) to (6) above, wherein the second face has a refractive index below 1.50.
(8) The liquid crystal display according to any of (1) to (7) above, wherein the first face has a 180° peel strength on stainless steel plate equivalent to at least 70% of the second face's 180° peel strength on stainless steel plate.
(9) The liquid crystal display according to any of (1) to (8) above, wherein the PSA sheet has a thickness in the range between 10 μm and 50 μm.
(10) The liquid crystal display according to any of (1) to (9) above, wherein the high-RI particles have a mean particle diameter in the range between 1 nm and 100 nm.
(11) The liquid crystal display according to any of (1) to (10) above, wherein the high-RI particles are concentrated in a range that extends from the first face towards the second face side and has a thickness of 100 nm or greater and less than 1000 nm.
(12) The liquid crystal display according to any of (1) to (10) above, wherein the high-RI particles are concentrated in a range that extends from the first face towards the second face side and has a thickness of 1000 nm or greater and 5000 nm or less.
(13) The liquid crystal display according to any of (1) to (12) above, wherein the PSA layer is an acrylic PSA layer comprising an acrylic polymer as base polymer.
(14) The liquid crystal display according to any of (1) to (13) above, wherein the PSA layer further comprises a colorant.
(15) The liquid crystal display according to (14) above, wherein the colorant is included at least in a thickness range from the second face to 50% of the PSA layer thickness. The PSA sheet according to claim 8.
(16) A PSA sheet having a PSA layer, wherein
the PSA sheet has a total light transmittance below 80%;
the PSA layer has a first face and a second face on the opposite side to the first face;
the PSA layer comprises high-RI particles; and
in the PSA layer, the high-RI particles are concentrated in a range that extends from the first face towards the second face side and has a thickness of at least 100 nm, accounting for less than 50% of the PSA layer thickness.
(17) The PSA sheet according to (16) above, wherein the total light transmittance is 10% or lower.
(18) The PSA sheet according to any of (16) or (17) above, that is an adhesively double-faced PSA sheet that consists of the PSA layer and is free of a substrate.
(19) The PSA sheet according to any of (16) to (18) above, wherein the first face is higher in refractive index by at least 0.05 than the second face.
(20) The PSA sheet according to any of (16) to (19) above, wherein the first face has a refractive index of 1.50 or higher.
(21) The PSA sheet according to any of (16) to (20) above, wherein the second face has a refractive index below 1.50.
(22) The PSA sheet according to any of (16) to (21) above, wherein the first face has a 180° peel strength on stainless steel plate equivalent to at least 70% of the second face's 180° peel strength on stainless steel plate.
(23) The PSA sheet according to any of (16) to (22) above, wherein the PSA sheet has a thickness in the range between 10 μm and 50 μm.
(24) The PSA sheet according to any of (16) to (23) above, wherein the high-RI particles have a mean particle diameter in the range between 1 nm and 100 nm.
(25) The PSA sheet according to any of (16) to (24) above, wherein the high-RI particles are concentrated in a range that extends from the first face towards the second face side and has a thickness of 100 nm or greater and less than 1000 nm.
(26) The PSA sheet according to any of (16) to (24) above, wherein the high-RI particles are concentrated in a range that extends from the first face towards the second face side and has a thickness of 1000 nm or greater and 5000 nm or less.
(27) The PSA sheet according to any of (16) to (26) above, wherein the PSA layer is an acrylic PSA layer comprising an acrylic polymer as base polymer.
(28) The PSA sheet according to any of (16) to (27) above, wherein the PSA layer is formed of a PSA crosslinked with an isocyanate-based crosslinking agent and/or an epoxy-based crosslinking agent.
(29) The PSA sheet according to any of (16) to (28) above, comprising, as the high-RI particles, at least one species selected among metal particles, metal compound particles, organic particles and inorganic/organic composite particles.
(30) The PSA sheet according to (29) above, comprising particles formed of a metal oxide, as the high-RI particles.
(31) The PSA sheet according to any of (16) to (30) above, wherein the PSA layer further comprises a colorant.
(32) The PSA sheet according to (31) above, comprising a black colorant as the colorant.
(33) The PSA sheet according to (31) above, comprising carbon black particles as the colorant.
(34) The PSA sheet according to any of (31) to (33) above, wherein the colorant is included at least in a thickness range from the second face to 50% of the PSA layer thickness.
(35) The PSA sheet according to any of (31) to (34) above, wherein the colorant has a volume average particle diameter of 500 nm or less.
(36) The PSA sheet according to any of (31) to (35) above, wherein the colorant content in the PSA layer is 1.0% by weight or greater.
(37) A method for producing the PSA sheet in the liquid crystal display according to any of (1) to (15) above or the PSA sheet according to any of (16) to (36), the method comprising
obtaining a dispersion comprising the high-RI particles and a dispersion medium,
providing the dispersion to one face of a pre-formed starting PSA layer, and
allowing the starting PSA layer provided with the dispersion to dry to form a PSA layer.
(38) The method according to (37) above, wherein the PSA layer is formed using a solvent-based PSA composition.
(39) A method for producing the PSA sheet in the liquid crystal display according to any of (1) to (15) above or the PSA sheet according to any of (16) to (36), the method comprising
obtaining a base PSA composition,
obtaining a dispersion comprising the high-RI particles and a dispersion medium, applying the base PSA composition and the dispersion by wet-on-wet coating, and allowing the resulting wet-on-wet coating to cure to form a PSA layer.

(40) The method according to (39) above, wherein the step of allowing the coating to cure includes allowing the coating to dry.

(41) The method according to (39) or (40) above, using a solvent-based PSA composition as the base PSA composition.

(42) The method according to any of (37) to (41) above, wherein the dispersion has a high-RI particle concentration of 0.1% by weight or higher and 10% by weight or lower.

(43) The method according to any of (37) to (42) above, wherein the high-RI particles have a weight fraction W1 of 50% by weight or higher in the dry weight of the dispersion.

(44) The PSA sheet according to any of (16) to (36) above, used for fixing a component in a portable electronic device.

(45) The PSA sheet according to any of (16) to (36) above, that is placed on the backside of a screen in a portable electronic device.

(46) The PSA sheet according to any of (16) to (36) above, that is used in a portable electronic device comprising an optical sensor.

(47) The PSA sheet according to any of (16) to (36) above, that is applied to a material having a refractive index of 1.50 or higher.

(48) The PSA sheet according to (47) above, wherein the material has a total light transmittance of 80% or higher.

(49) A laminate having the PSA sheet according to any of (17) to (36) and (43) to (48) above, and a member to which the PSA sheet is adhered, wherein the member has a refractive index of 1.50 or higher.

EXAMPLES

Several examples relating to the present invention will be described hereinbelow, but the present invention is not to be limited to these examples. In the description below, "parts" and "%" are by weight unless otherwise specified.

<Measurement and Evaluation Methods>

[Thickness of $P_{HRI}$-Concentrated Region]

Under a liquid nitrogen atmosphere, a PSA sample is flash-frozen. In a freezing atmosphere at −30° C., using an ultramicrotome (model UC7 by Leica Microsystems GmbH), an approximately 100 nm thick slice is cut out of the sample to obtain an ultrathin section. Using a transmission electron microscope (TEM; by Hitachi High-Technologies Corporation; acceleration voltage 100 kV), the resulting ultrathin section is subjected to TEM analysis. From a TEM image magnified about 40,000 times, the thickness of the $P_{HRI}$-concentrated region is determined.

The thickness of the $P_{HR}$-concentrated region is the average depth of the boundary between the region with dispersed high-RI particles and the region with no dispersed high-RI particles, measured from the PSA layer's first face in the TEM image. When the boundary is difficult to identify, the TEM image is binarized by image analysis software and the depth of the region having 90% (by area) of the high-RI particles is taken as the thickness of the $P_{HRI}$-concentrated region. For high-RI particle identification, analysis is carried out, excluding high-RI particles on edges of the image. For instance, imageJ can be used as the image analysis software.

[Total Light Transmittance]

The total light transmittance (%) of the PSA sheet is the total light transmittance in the thickness direction of the PSA sheet peeled from the release liner and is determined based on JIS K 7136:2000, using a commercial transmissometer. As the transmissometer, product name HAZEMETER HM-150 available from Murakami Color Research Laboratory Co., Ltd. or a comparable product is used.

[Refractive Index]

As for the refractive index of the PSA layer surface, Condition (1) applies to the measurement when the total light transmittance of the PSA sheet is 50% or higher; Condition (2) applies to the measurement when the total light transmittance is below 50%.

(Condition (1))

Using a multi-wavelength Abbe refractometer, a refractive index measurement is carried out in the 380 nm to 1500 nm wavelength range and the refractive index at 500 nm wavelength is read. As the multi-wavelength Abbe refractometer, model DR-M2 available from ATAGO Co., Ltd. or a comparable product is used.

(Condition (2))

Using a spectroscopic ellipsometer, at 23° C., the refractive index is determined. In particular, with respect to the PSA sheet surface (adhesive face) peeled from the release liner, a refractive index measurement is carried out in the 380 nm to 1500 nm wavelength range and the refractive index at 500 nm wavelength is read. The measurement is performed upon adhesion of a black plate to the unmeasured face (the opposite side to the measured side). As the spectroscopic ellipsometer, product name EC-400 available from J.A. Woollam Company or a comparable product is used.

[180° Peel Strength (Adhesive Strength)]

In a measurement environment at 23° C. and 50% RH, to one adhesive face of a double-faced PSA sheet, 50 μm thick PET film is applied for backing. The resultant is cut into a 10 mm wide and 100 mm long size to prepare a measurement sample. In an environment at 23° C. and 50% RH, the adhesive face of the measurement sample is press-bonded to the surface of a stainless steel plate (SUS 304BA plate) with a 2 kg roller moved back and forth once. The resultant is allowed to stand for 30 minutes in the same environment. Subsequently, based on JIS Z 0237:2000, using a universal tensile and compression tester, at a tensile speed of 300 mm/min at a peel angle of 180°, the peel strength (adhesive strength) (N/10 mm) is determined. As the universal tensile and compression tester, for instance, "tensile compression tester TG-1kN" by Minebea Co., Ltd., or an equivalent device is used. In case of a single-faced PSA sheet, the PET film backing is unnecessary.

Example 1

(Preparation of Acrylic Polymer)

Into a reaction vessel equipped with a stirrer, thermometer, nitrogen inlet, condenser and dropping funnel, were placed 95 parts of BA and 5 parts of AA as starting monomers and 233 parts of ethyl acetate as the polymerization solvent. The resulting mixture was allowed to stir under a nitrogen flow for two hours to eliminate oxygen from the polymerization system. Subsequently, was added 0.2 part of 2,2'-azobisisobutylonitrile as the polymerization initiator. The solution polymerization was carried out at 60° C. for eight hours to obtain a solution of acrylic polymer. The acrylic polymer had a Mw of about 70×10$^4$.

(Preparation of PSA composition C1)

To the acrylic polymer solution, relative to 100 parts of acrylic polymer in the solution, were added 20 parts of terpene-phenol resin as a tackifier resin, 0.8 part of 1,2,3-benzotriazole (product name BT-120 available from Johoku Chemical Co., Ltd.) as a rust inhibitor, 3 parts of an isocyanate-based crosslinking agent and 0.01 part of an epoxy-based crosslinking agents as crosslinking agents. To this, were further added carbon black particles. The resultant was stirred and mixed to prepare a PSA composition C1. As the carbon black particles, was used product name ATDN101 Black (mean particle diameter 350 nm; available from Dainichiseika Color & Chemicals Mfg. Co. Ltd.) in an amount equivalent to 2.0% (by weight) of the dry weight of the PSA composition C1. As the terpene-phenol resin (tackifier resin), was used product name YS POLYSTAR T-115 (available from Yasuhara Chemical Co., Ltd.; softening point ~115° C., hydroxyl value 30-60 mgKOH/g). As the isocyanate-based crosslinking agent, was used product name CORONATE L (available from Tosoh Corporation; a 75% (by weight) ethyl acetate solution of a trimethylolpropane/tolylene diisocyanate trimer adduct). As the epoxy-based crosslinking agent, was used product name TETRAD-C (available from Mitsubishi Gas Chemical Co., Inc.; 1,3-bis (N,N-diglycidylaminomethyl)cyclohexane).
(Preparation of High-RI Particle Dispersion P1)

With ethanol, was diluted surface-treated zirconia particles (mean particle diameter 20 nm; dispersion medium: ethanol; available from CIK NanoTek Corporation) to obtain a dispersion P1 (particle concentration: 2.0% by weight).
(Preparation of PSA Sheet)

To the release face of a 75 μm thick polyester release film (product name PET-75-SCAO available from Fujiko Co., Ltd.), was applied the PSA composition C1, allowed to dry at 100° C. for two minutes and then allowed to age at 23° C. for 96 hours (or shortly said as "allowed to dry and age" hereinafter) to obtain a 25 μm thick PSA layer D1.

To one (first) face of the PSA layer D1, the dispersion P1 was applied (by wet-on-dry (WOD) coating) and allowed to dry to obtain a PSA layer E1. To the first face (coated with the dispersion P1) of the PSA layer E1, was adhered the release face of a 75 μm thick polyester release liner (product name DIAFOIL MRF available from Mitsubishi Polyester Film Inc.). In this manner, was prepared a 25 μm thick substrate-free double-faced PSA sheet (consisting of the PSA layer E1) with both faces protected with release liners R1 and R2.

With the surface-treated zirconia particles (high-RI particles $P_{HRI}$ absorbed into the PSA layer D1 from its first face, the first face side of the PSA layer E1 is a $P_{HRI}$-concentrated region having the thickness shown in Table 1.

Example 2

(Preparation of PSA Composition C2)

In the preparation of PSA composition C1 according to Example 1, to the acrylic polymer solution, for every 100 parts of acrylic polymer in the solution, was further added 100 parts (based on solid content) of surface-treated zirconia particles (mean particle diameter 40 nm; dispersion medium: dimethylacetamide (DMA); available from CIK NanoTek Corporation). Otherwise in the same manner as the preparation of PSA composition C1, was prepared a PSA composition C2.
(Preparation of PSA Sheet)

To the release face of release liner R1, was applied the PSA composition C2 and allowed to dry and age to obtain a 25 μm thick PSA layer D2. To the PSA layer D2, was adhered the release face of release liner R2 to prepare a 25 μm thick substrate-free double-faced PSA sheet (consisting of the PSA layer D2) with both faces protected with release liners R1 and R2. The PSA layer D2 includes high-RI particles $P_{HRI}$ throughout the entire thickness range.

Example 3

To the release face of release liner R1, was applied the PSA composition C1 and allowed to dry and age to obtain a 25 μm thick PSA layer D1. To the PSA layer D1, was adhered the release face of release liner R2 to prepare a 25 μm thick substrate-free double-faced PSA sheet (consisting of the PSA layer D1) with both faces protected with release liners R1 and R2. The PSA layer D1 is free of high-RI particles.

Table 1 shows features of the PSA sheets according to Examples 1 to 3 and the results of testing total light transmittance, first face's refractive index and adhesive strength. The adhesive strength retention rates of Examples 1 and 2 shown in Table 1 were determined with the adhesive strength of Example 3 free of high-RI particles being 100%.

TABLE 1

|  |  | Ex. 1 | Ex. 2 | Ex. 3 |
|---|---|---|---|---|
| PSA sheet thickness (μm) |  | 25 | 25 | 25 |
| $P_{HRI}$-concentrated region | Thickness (μm) | 0.15 | Included in entire range | Not included |
|  | % thickness | 0.60 |  |  |
| Refractive index |  | 1.55 | 1.56 | 1.47 |
| Total light transmittance (%) |  | 8.5 | 8.5 | 8.5 |
| Adhesive strength (N/10 mm) |  | 4.9 | 3.3 | 5.2 |
| Adhesive strength retention rate |  | 94% | 63% | 100% |

As shown in Table 1, with respect to the embodiments limited in total light transmittance, in Examples 1 and 2 having $P_{HRI}$-containing PSA layers, the first-face refractive index increased as compared with Example 3. In Example 1 with high-RI particles concentrated in the PSA layer's first face side, the refractive index was increased while the decrease in adhesive strength was reduced.

Example 4

The coating amount of PSA composition C1 was adjusted to form a 20 μm thick PSA layer D4. Otherwise in the same manner as Example 1, was obtained a substrate-free double-faced PSA sheet according to this Example.

Examples 5 and 6

(Preparation of High-RI Dispersions P2 and P3)

In the preparation of dispersion P1, the level of dilution with ethanol was adjusted to prepare a dispersion P2 (particle concentration: 2.5% by weight) and a dispersion P3 (particle concentration: 5.0% by weight).
(Preparation of PSA Sheet)

In place of the dispersion P1, was used the dispersion P2 (Ex. 5) or dispersion P3 (Ex. 6). Otherwise in the same manner as Example 4, were prepared substrate-free double-faced PSA sheets according to the respective Examples.

Example 7 to 10

(Preparation of High-RI Dispersion P4)

Surface-treated zirconia particles (mean particle diameter 20 nm; dispersion medium: methyl ethyl ketone (MEK); available from CIK NanoTek Corporation) were diluted with MEK to prepare a dispersion P4 (particle concentration: 2.0% by weight).

(Preparation of PSA Sheet)

To the release face of release liner R1, using a tandem coater, were applied the PSA composition C1 and the dispersion P4 thereatop, and allowed to dry and age to obtain 35 μm thick PSA layers F7 to F10 corresponding to Examples 7 to 10. The coating amounts of PSA composition C1 were about the same as the coating amount of PSA composition C1 in Example 12 shown below. The coating amounts of dispersion P4 were adjusted to obtain $P_{HRI}$-concentrate region thicknesses of about 1.0 μm to 5.0 μm.

To the first faces of PSA layers F7 to F10, were adhered the release faces of release liners R2 to prepare substrate-free double-faced PSA sheets with both faces protected with release liners R1 and R2. Dried with the PSA composition C1 partially blended with the dispersion P4 applied thereatop, the first face sides of PSA layers F7 to F10 are $P_{HRI}$-concentrated regions (formed by the wet-on-wet (WOW) method) having the thicknesses shown in Table 2.

Example 11

The coating amount of PSA composition C2 was adjusted to form a 35 μm thick PSA layer. Otherwise in the same manner as Example 2, was obtained a substrate-free double-faced PSA sheet according to this Example.

Example 12

The coating amount of PSA composition C1 was adjusted to form a 35 μm thick PSA layer. Otherwise in the same manner as Example 3, was obtained a substrate-free double-faced PSA sheet according to this Example. This PSA layer is free of high-RI particles.

Table 2 shows features of the PSA sheets according to Examples 4 to 12 and the results of testing total light transmittance, first face's refractive index and adhesive strength. The adhesive strength retention rates of Examples 4 to 11 shown in Table 2 were determined with the adhesive strength of Example 12 being 100%.

Example 14

The coating amount of PSA composition C1 was adjusted to form a 20 μm thick PSA layer. Otherwise in the same manner as Example 3, was obtained a substrate-free double-faced PSA sheet according to this Example. This PSA layer is free of high-RI particles.

Examples 15 to 17

The coating amounts of PSA composition C1 were adjusted to the same coating amount as in the preparation of the PSA sheet according to Example 18 shown below. Otherwise in the same manner as Examples 7 to 10, were obtained about 50 μm thick PSA layers F15 to F17 corresponding to Examples 15-17. To the first faces of the resulting PSA layers, were adhered the release faces of release liners R2 to prepare substrate-free double-faced PSA sheets with both faces protected with release liners R1 and R2. The first face sides of PSA layers F15 to F17 are $P_{HRI}$-concentrated regions having the thicknesses shown in Table 4.

Example 18

The coating amount of PSA composition $C_1$ was adjusted to form a 50 μm thick PSA layer. Otherwise in the same manner as Example 3, was obtained a substrate-free double-faced PSA sheet according to this Example. This PSA layer is free of high-RI particles.

Tables 3 and 4 show features of the PSA sheets according to Examples 13 to 18 and the results of testing total light transmittance, first face's refractive index and adhesive strength. The adhesive strength retention rate of Example 13 shown in Table 3 was determined with the adhesive strength of Example 14 being 100%. The adhesive strength retention rates of Examples 15 to 17 shown in Table 4 were determined with the adhesive strength of Example 18 being 100%.

TABLE 2

|  | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|
| PSA sheet thickness (μm) | 35 | 35 | 35 | 35 | 35 | 35 | 35 | 35 | 35 |
| $P_{HRI}$-concentrated region Thickness (μm) | 0.15 | 0.2 | 0.25 | 1.0 | 1.5 | 2.0 | 5.0 | Included in entire range | Not included |
| $P_{HRI}$-concentrated region % thickness | 0.43 | 0.57 | 0.71 | 2.86 | 4.29 | 5.71 | 14.29 | | |
| Refractive index | 1.55 | 1.56 | 1.58 | 1.59 | 1.61 | 1.61 | 1.60 | 1.59 | 1.47 |
| Total light transmittance (%) | 2 | 2 | 2 | 2 | 2 | 2 | 2 | 2 | 2 |
| Adhesive strength (N/10 mm) | 6.3 | 6.0 | 5.7 | 5.5 | 5.5 | 5.4 | 5.5 | 4.5 | 6.6 |
| Adhesive strength retention rate | 95% | 91% | 86% | 83% | 83% | 82% | 83% | 68% | 100% |

As shown in Table 2, with respect to the embodiments limited in total light transmittance, in Examples 4 to 11 having $P_{HRI}$-containing PSA layers, the first-face refractive index increased as compared with Example 12. In Examples 4 to 10 with high-RI particles concentrated in their PSA layer's first face sides, the refractive index was increased while the decrease in adhesive strength was reduced.

Example 13

The coating amount of PSA composition C1 was adjusted to form a 20 μm thick PSA layer. Otherwise in the same manner as Example 1, was obtained a substrate-free double-faced PSA sheet according to this Example.

TABLE 3

|  | Ex. 13 | Ex. 14 |
|---|---|---|
| PSA sheet thickness (μm) | 20 | 20 |
| $P_{HRI}$-concentrated Thickness (μm) | 0.15 | Not included |
| $P_{HRI}$-concentrated % thickness | 0.75 | |
| Refractive index | 1.55 | 1.47 |
| Total light transmittance (%) | 10 | 10 |
| Adhesive strength (N/10 mm) | 4.5 | 4.9 |
| Adhesive strength retention rate | 92% | 100% |

TABLE 4

|  |  | Ex. 15 | Ex. 16 | Ex. 17 | Ex. 18 |
|---|---|---|---|---|---|
| PSA sheet thickness (μm) | | 50 | 50 | 50 | 50 |
| $P_{HRI}$-concentrated region | Thickness (μm) | 1.0 | 2.0 | 5.0 | Not included |
| | % thickness | 2.00 | 4.00 | 10.00 | |
| Refractive index | | 1.59 | 1.61 | 1.6 | 1.47 |
| Total light transmittance (%) | | 0.5 | 0.5 | 0.5 | 0.5 |
| Adhesive strength (N/10 mm) | | 6.7 | 6.5 | 6.6 | 7.5 |
| Adhesive strength retention rate | | 89% | 87% | 88% | 100% |

As shown in Table 3, with respect to the embodiments limited in total light transmittance, according to Example 13 with the high-RI particle content concentrated in the first face side of the PSA layer, the first-face refractive index was increased as compared with Example 14 while the decrease in adhesive strength was reduced.

In addition, as shown in Table 4, with respect to the embodiments limited in total light transmittance, according to Examples 15 to 17 with the high-RI particle contents concentrated in the first face sides of the PSA layers, the first-face refractive index was increased as compared with Example 18 while the decrease in adhesive strength was reduced.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 1, 2, 3 PSA sheets
10 support substrate
10A first face
10B second face
21 PSA layer, first PSA layer
21A first adhesive face (first face)
21B second adhesive face (second face)
22 second PSA layer
22A second adhesive face (second face)
31, 32 release liners
40 PSA layer
40A first face
40B second face
42 high-RI particle (particle $P_{HRI}$)
44 $P_{HRI}$-concentrated region (Region A)
46 base region
$T_A$ thickness of $P_{HRI}$-concentrated region (Region A)
$T_0$ thickness of PSA layer

The invention claimed is:

1. A pressure-sensitive adhesive sheet having a pressure-sensitive adhesive layer, wherein
   the pressure-sensitive adhesive sheet has a total light transmittance below 80%;
   the pressure-sensitive adhesive layer has a first face and a second face on the opposite side to the first face;
   the pressure-sensitive adhesive layer comprises high-refractive-index particles and a black colorant;
   in the pressure-sensitive adhesive layer, the high-refractive-index particles are concentrated in a region that extends from the first face towards the second face side and the region has a thickness of at least 100 nm and accounts for less than 50% of the pressure-sensitive adhesive layer thickness, and
   the black colorant is included at least in a thickness range from the second face to 50% of the pressure-sensitive adhesive layer thickness.

2. The pressure-sensitive adhesive sheet according to claim 1, wherein the total light transmittance is 10% or lower.

3. The pressure-sensitive adhesive sheet according to claim 1, wherein the first face is higher in refractive index by at least 0.05 than the second face.

4. The pressure-sensitive adhesive sheet according to claim 1, wherein the first face has a 180° peel strength on stainless steel plate equivalent to at least 70% of the second face's 180° peel strength on stainless steel plate.

5. The pressure-sensitive adhesive sheet according to claim 1, wherein the pressure-sensitive adhesive sheet has a thickness in the range between 10 μm and 50 μm.

6. The pressure-sensitive adhesive sheet according to claim 1, wherein the high-refractive-index particles have a mean particle diameter in the range between 1 nm and 100 nm.

7. The pressure-sensitive adhesive sheet according to claim 1, wherein the pressure-sensitive adhesive layer is an acrylic pressure-sensitive adhesive layer comprising an acrylic polymer as base polymer.

8. The pressure-sensitive adhesive sheet according to claim 1, used for fixing a component in a portable electronic device.

* * * * *